US012651385B2

(12) United States Patent
Chen et al.

(10) Patent No.: US 12,651,385 B2
(45) Date of Patent: Jun. 9, 2026

(54) IMAGE PROCESSING METHOD AND ELECTRONIC DEVICE

(71) Applicant: Honor Device Co., Ltd., Shenzhen (CN)

(72) Inventors: Conger Chen, Shenzhen (CN); Jinxiao Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 186 days.

(21) Appl. No.: 18/252,920

(22) PCT Filed: Jun. 9, 2022

(86) PCT No.: PCT/CN2022/097931
§ 371 (c)(1),
(2) Date: May 15, 2023

(87) PCT Pub. No.: WO2022/258024
PCT Pub. Date: Dec. 15, 2022

(65) Prior Publication Data
US 2023/0419570 A1      Dec. 28, 2023

(30) Foreign Application Priority Data

Jun. 10, 2021     (CN) .......................... 202110650009.7

(51) Int. Cl.
*G06T 11/23*          (2026.01)
*G06T 1/20*           (2006.01)
*G06T 3/40*           (2024.01)
(52) U.S. Cl.
CPC ................ *G06T 11/23* (2026.01); *G06T 1/20* (2013.01); *G06T 3/40* (2013.01)
(58) Field of Classification Search
CPC ........... G06T 11/203; G06T 1/20; G06T 3/40; Y02D 30/70; H04M 1/72439
See application file for complete search history.

(56) References Cited

U.S. PATENT DOCUMENTS 8,284,207 B2 * 10/2012 Bakalash .............. G06F 9/5044
345/506
9,898,853 B2      2/2018 Woo et al.
(Continued)

FOREIGN PATENT DOCUMENTS

CN          103500463 A      1/2014
CN          104077741 A      10/2014
(Continued)

OTHER PUBLICATIONS

Garbe, M., et al., "Introduction to the Android Graphics Pipeline", Wissenschaftliche Arbeit zur Erlangung des Grades Bachelor of Science (B.Sc.) in Informatik an der Hochschule Karlsruhe— Technik und Wirtschaft, Mar. 1, 2014, Retrieved from the internet, URL:http://upload-images.jcodecraeer.com/upload-images-old/files/introduction-Android-graphics.pdf, 88 pages.
(Continued)

*Primary Examiner* — Said Broome
*Assistant Examiner* — Jordan Wan Yick
(74) *Attorney, Agent, or Firm* — Conley Rose, P.C.

(57) ABSTRACT

An example of an image processing method includes determining a first primary scene in a process of executing rendering processing on a first image, where the first primary scene is a frame buffer that executes a largest quantity of rendering operations in the process of rendering the first image by the electronic device; configuring a temporary frame buffer, where resolution of the temporary frame buffer is less than resolution of the first primary scene; and executing a first rendering operation on the temporary frame buffer when rendering processing is performed on the first image, where the first rendering operation is a rendering operation executed on the first primary scene indicated by an application program.

20 Claims, 9 Drawing Sheets

(56) References Cited

U.S. PATENT DOCUMENTS

| | | | | |
|---|---|---|---|---|
| 9,928,021 | B2 * | 3/2018 | Roy | G09G 5/395 |
| 10,510,175 | B2 | 12/2019 | Qiu | |
| 11,222,397 | B2 | 1/2022 | Saleh et al. | |
| 2005/0162435 | A1 * | 7/2005 | Hashimoto | G06T 11/40 |
| | | | | 345/545 |
| 2009/0262125 | A1 * | 10/2009 | Swaminathan | H04N 13/10 |
| | | | | 345/581 |
| 2011/0157201 | A1 | 6/2011 | Hedges | |
| 2013/0120388 | A1 | 5/2013 | O'Donnell et al. | |
| 2017/0200253 | A1 * | 7/2017 | Ling | G09G 5/399 |
| 2017/0200308 | A1 | 7/2017 | Nguyen et al. | |
| 2017/0330496 | A1 | 11/2017 | Oravainen | |
| 2021/0358192 | A1 | 11/2021 | Zhang et al. | |
| 2022/0207821 | A1 | 6/2022 | Xu et al. | |
| 2023/0113571 | A1 | 4/2023 | Huanhuan et al. | |

FOREIGN PATENT DOCUMENTS

| | | | |
|---|---|---|---|
| CN | 104157004 | A | 11/2014 |
| CN | 106204700 | A | 12/2016 |
| CN | 108369726 | A | 8/2018 |
| CN | 108776987 | A | 11/2018 |
| CN | 109064538 | A | 12/2018 |
| CN | 109559270 | A | 4/2019 |
| CN | 110060325 | A | 7/2019 |
| CN | 110471731 | A | 11/2019 |
| CN | 111508055 | A | 8/2020 |
| CN | 111696186 | A | 9/2020 |
| CN | 112533059 | A | 3/2021 |
| CN | 112686981 | A | 4/2021 |
| CN | 113726950 | A | 11/2021 |
| CN | 111292405 | B | 4/2022 |
| WO | 2017092019 | A1 | 6/2017 |
| WO | 2018118203 | A1 | 6/2018 |
| WO | 2020156264 | A1 | 8/2020 |
| WO | 2021073448 | A1 | 4/2021 |

OTHER PUBLICATIONS

Li, Y., "A Real-Time High-Quality System for Depth Image-Based Rendering" Doctoral Dissertation, Apr. 15, 2019, 108 pages.

Li, Y., "A Real-Time High-Quality System for Depth Image-Based Rendering," Doctoral Dissertation, Apr. 15, 2019, 108 pages. With English Translation.

* cited by examiner

Electronic device 400

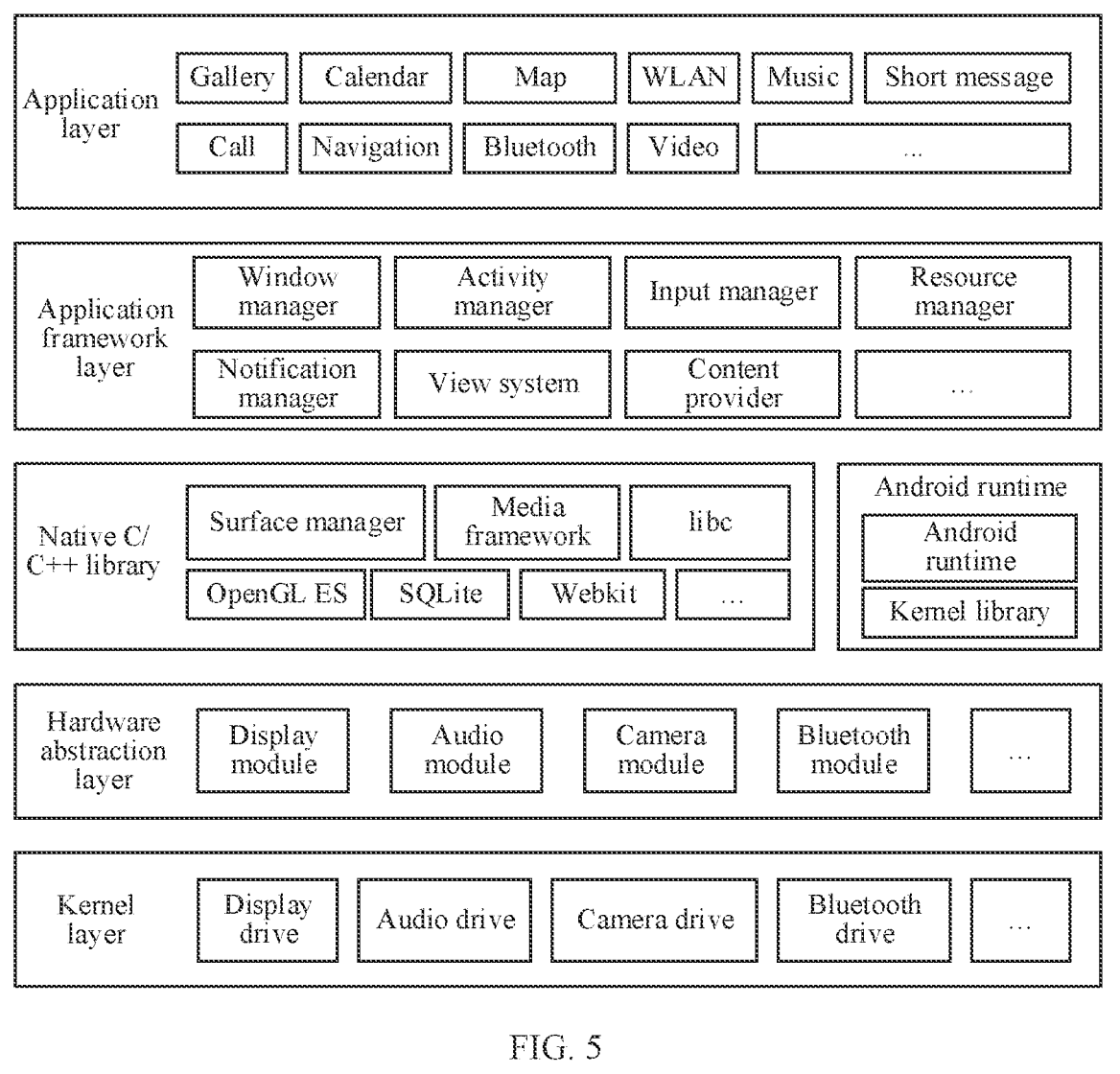

| Application layer | Gallery | Calendar | Map | WLAN | Music | Short message |
|---|---|---|---|---|---|---|
| | Call | Navigation | Bluetooth | Video | ... | |

| Application framework layer | Window manager | Activity manager | Input manager | Resource manager |
|---|---|---|---|---|
| | Notification manager | View system | Content provider | ... |

| Native C/ C++ library | Surface manager | Media framework | libc | Android runtime |
|---|---|---|---|---|
| | OpenGL ES | SQLite | Webkit | ... | Android runtime |
| | | | | | Kernel library |

| Hardware abstraction layer | Display module | Audio module | Camera module | Bluetooth module | ... |
|---|---|---|---|---|---|

| Kernel layer | Display drive | Audio drive | Camera drive | Bluetooth drive | ... |
|---|---|---|---|---|---|

FIG. 5

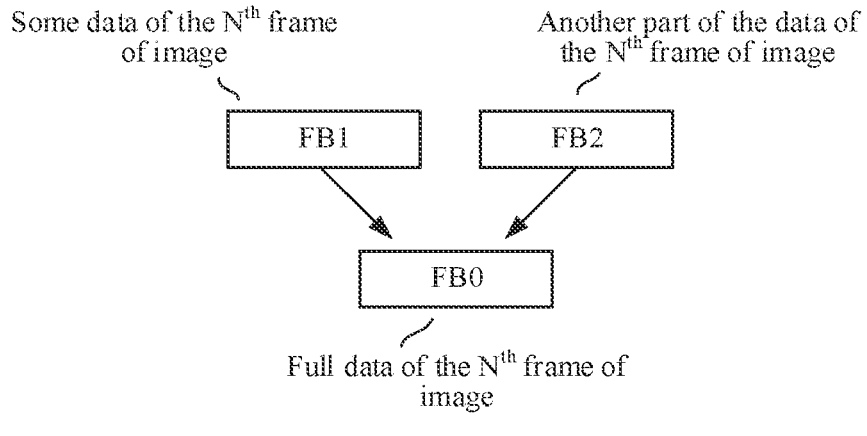

Some data of the N$^{th}$ frame of image

Another part of the data of the N$^{th}$ frame of image

FB1    FB2

FB0

Full data of the N$^{th}$ frame of image

FIG. 6C

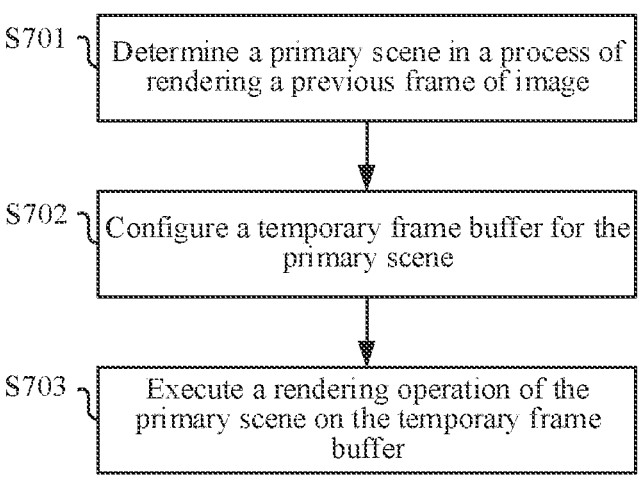

S701    Determine a primary scene in a process of rendering a previous frame of image S702    Configure a temporary frame buffer for the primary scene S703    Execute a rendering operation of the primary scene on the temporary frame buffer

FIG. 7A

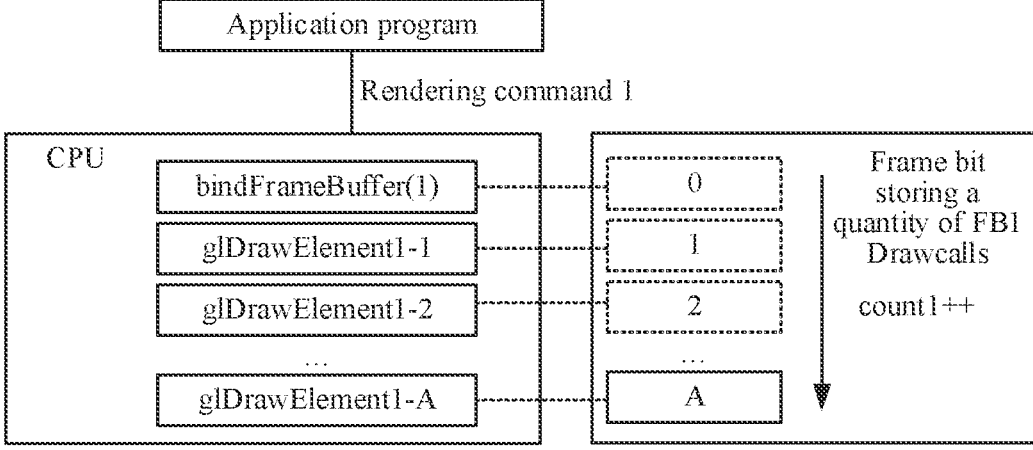

Application program

Rendering command 1

CPU bindFrameBuffer(1)    0 glDrawElement1-1    1 glDrawElement1-2    2

...    ...

glDrawElement1-A    A

Frame bit storing a quantity of FB1 Drawcalls count1++

FIG. 7B

IMAGE PROCESSING METHOD AND ELECTRONIC DEVICE

CROSS-REFERENCE TO RELATED APPLICATIONS

This application is a U.S. National Stage of International Application No. PCT/CN2022/097931 filed on Jun. 9, 2022, which claims priority to Chinese Patent Application No. 202110650009.7, filed with the China National Intellectual Property Administration on Jun. 10, 2021, both of which are incorporated herein by reference in their entireties.

TECHNICAL FIELD

Embodiments of this application relate to the field of image processing, and in particular, to an image processing method and an electronic device.

BACKGROUND

With the development of an electronic device, a requirement for a capability of displaying an image of the electronic device is increasingly high.

For example, the electronic device is a mobile phone. In order to provide a clearer image display for a user, the mobile phone may display an image to the user at a higher resolution. When the mobile phone renders and obtains an image with a higher resolution, more power consumption is produced, resulting in problems such as excessive computing power overheads and severe heat generation. In addition, the mobile phone may run slowly in a severe case, seriously affecting user experience.

SUMMARY

Embodiments of this application provide an image processing method and an electronic device. A large quantity of rendering operations in a primary scene may be executed at a relatively small resolution, thereby achieving an effect of reducing rendering power consumption.

To achieve the foregoing objective, the following technical solutions are used in the embodiments of this application.

According to a first aspect, an image processing method is provided, which is applicable to rendering processing of a first image by an electronic device. The electronic device runs an application program, the electronic device calls one or more frame buffers when rendering the first image, and a rendering operation of the electronic device to execute the rendering processing on the first image is issued by the application program. The method includes the following steps: determining a first primary scene in a process of executing rendering processing on a first image, where the first primary scene is a frame buffer that executes a largest quantity of rendering operations in the process of rendering the first image by the electronic device, configuring a temporary frame buffer, where resolution of the temporary frame buffer is less than resolution of the first primary scene; and executing a first rendering operation on the temporary frame buffer when rendering processing is performed on the first image, where the first rendering operation is a rendering operation executed on the first primary scene indicated by an application program.

Based on the solution, a solution for reducing rendering power consumption in the primary scene is provided. In this example, the electronic device can configure a temporary frame buffer with a smaller resolution for the primary scene (for example, a largest frame buffer that executes rendering processing). The electronic device can further execute a rendering operation that would otherwise need to be executed on the primary scene on the temporary frame buffer. In this way, the rendering operation can be executed at a smaller resolution, thereby saving excessive rendering power consumption caused by a large quantity of rendering operations with high resolutions. It may be understood that in this example, objects configuring the temporary frame buffer and executing the rendering operation on the temporary frame buffer are the primary scene, that is, the frame buffer executing the largest quantity of rendering operations. In some other implementations of this application, the electronic device may further configure corresponding temporary frame buffers with smaller resolutions for other frame buffers with more rendering operations, and execute rendering operations at lower resolutions on the corresponding temporary frame buffers, thereby increasing a quantity of rendering operations executed at smaller resolutions, and further reducing the power consumption of the rendering operations.

In a possible design, the determining a first primary scene in a process of executing rendering processing on a first image includes: determining the first primary scene based on the frame buffer that executes a largest quantity of rendering operations in a process of rendering a second image, where rendering processing of the second image is executed before the rendering processing of the first image; and calling the first primary scene when the rendering processing is executed on the second image. Based on the solution, a solution for determining the first primary scene is provided. In this example, the electronic device can determine a primary scene of a current frame of image according to a quantity of rendering operations on each frame buffer in a processing of rendering other frames of images (such as the second image) before the current frame of image (such as the first image) is rendered. It may be understood that the rendering processing of the second image is executed before the rendering processing of the first image, so when the first image is being rendered, all rendering operations of the second image have been completed. Therefore, the electronic device can learn the quantity of rendering operations executed on each frame buffer in a process of rendering the second image. Due to continuity of images, in general, it may be considered that for the first image, the frame buffer executing the largest quantity of rendering operations is consistent with the second image. Therefore, in this example, the frame buffer executing the largest quantity of rendering operations in the process of rendering the second image may be used as the primary scene of the current frame of image (that is, the first image).

In a possible design, before the determining a first primary scene in a process of executing rendering processing on a first image, the method further includes: determining a quantity of drawcalls (drawcalls) executed on each frame buffer in the process of rendering the second image, and determining a frame buffer that executes a largest quantity of drawcalls as the first primary scene. Based on the solution, an example of a specific solution for determining the first primary scene is provided. In this example, a quantity of rendering operations may be represented by a quantity of drawcalls. For example, a larger quantity of drawcalls indicates a larger quantity of corresponding rendering operations, and vice versa. In this way, the electronic device can determine the frame buffer with the largest quantity of drawcalls as the first primary scene by determining a quantity of drawcalls on each frame buffer in the process of rendering the second image. It may be understood that since the primary scene has the largest quantity of drawcalls, the rendering processing on the primary scene is the most complicated and requires more power consumption. Therefore, with reference to the foregoing solution, executing the solution on the frame buffer with the largest quantity of drawcalls (that is, the primary scene) can achieve a better effect of reducing power consumption.

In a possible design, the second image is a previous frame of image of the first image. Based on the solution, a specific solution for selecting the second image is provided. For example, the second image may be a previous frame of image of the first image. In this way, since the second image is very close to an image to be displayed by the first image, the first primary scene determined according to the quantity of drawcalls in the process of rendering the second image is more accurate.

In a possible design, the electronic device is provided with a processor and a rendering processing module. The executing a first rendering operation on the temporary frame buffer includes: in a case that a rendering command for the first image is received from the application program, the processor issues a first rendering instruction to the rendering processing module, where the first rendering instruction includes the first rendering operation, and the first rendering instruction is used for instructing the rendering processing module to execute the first rendering operation on the temporary frame buffer. The rendering processing module executes the first rendering operation on the temporary frame buffer based on the first rendering instruction. Based on the solution, an example of a specific solution for executing the first rendering operation is provided. In this example, the electronic device can implement the rendering operation of the primary scene at a smaller resolution through the cooperation of the processor and the rendering processing module. For example, the processor may issue a rendering instruction to the rendering processing module, to instruct the rendering processing module to execute a rendering operation that would otherwise be executed on a primary scene with a larger resolution on a temporary frame buffer with a smaller resolution. In this way, the rendering processing module can execute a corresponding rendering operation on the temporary frame buffer based on the rendering instruction, thereby achieving an effect of rendering at a smaller resolution.

In a possible design, before the processor issuing a first rendering instruction to the rendering processing module, the method further includes: in a case that the currently executed rendering command is determined as a rendering command for the primary scene, the processor replacing frame buffer information bound to the currently executed rendering command from first frame buffer information to second frame buffer information, to obtain the first rendering instruction, where the first frame buffer information is used for indicating that the first rendering operation is executed on the primary scene, and the second frame buffer information is used for indicating that the first rendering operation is executed on the temporary frame buffer. Based on the solution, a logic for determining the first rendering instruction sent by the processor to the rendering processing module is provided. In this example, the processor can execute a subsequent operation in a case that a current rendering command from an application program is determined as a rendering command for the primary scene. For example, the processor may compare a frame buffer object of a frame buffer bound to a current rendering command with a frame buffer object of the primary scene, and when results are consistent, the processor determines that the current rendering command is for the primary scene. Then, the processor may issue a rendering instruction to the rendering processing module, to instruct the rendering processing module to execute a rendering operation. In this example, the processor may replace frame buffer information originally pointing to the primary scene in the rendering instruction with frame buffer information pointing to the temporary frame buffer, and issue the frame buffer information pointing to the temporary frame buffer to the rendering processing module. In this way, the rendering processing module can execute a corresponding rendering operation on the frame buffer (for example, the temporary frame buffer) indicated by the rendering instruction based on the rendering instruction, thereby executing the rendering operation originally executed on the primary scene on the temporary frame buffer.

In a possible design, the first frame buffer information includes a first frame buffer object, where the first frame buffer object is a frame buffer object corresponding to the primary scene, and the second frame buffer information includes a second frame buffer object, where the second frame buffer object is a frame buffer object corresponding to the temporary frame buffer. Based on the solution, a specific implementation of the frame buffer information is provided. For example, the frame buffer information may include a frame buffer object. Take frame buffer information of replacing a bindFrameBuffer( ) function as an example. When the primary scene is FB1 and the temporary frame buffer is FB3, the rendering command may include a bindFrameBuffer(1). Correspondingly, without replacing the frame buffer information, the processor may issue a rendering instruction including the bindFrameBuffer(1) to the rendering processing module, to instruct the rendering processing module to execute a drawcall in the rendering instruction on FB1. When the solution described in this application is used, the frame buffer information of FB1 may be replaced with the frame buffer information of FB3. Then, when the rendering command may include the bindFrameBuffer(1), the processor may replace the bindFrameBuffer(1) with a bindFrameBuffer(3), and carry the bindFrameBuffer(3) in the rendering instruction, thereby instructing the rendering processing module to execute a corresponding rendering operation on FB3.

In a possible design, the rendering command is issued by the application program to the processor, and the rendering command includes the first rendering operation and the first frame buffer information. Based on the solution, a schematic basic composition of the rendering command is provided. In this example, the rendering command may be from an application program, and used for instructing the processor to execute a first rendering operation on the indicated frame buffer.

In a possible design, the processor is a central processing unit (CPU). Based on the solution, a specific implementation of the processor is provided. For example, the processor may be a CPU in an electronic device. In some other implementations, functions of the processor may further be implemented by other components or circuits with processing functions.

In a possible design, the rendering processing module is a graphics processing unit (GPU). Based on the solution, a specific implementation of the rendering processing module is provided. For example, the rendering processing module may be a GPU in an electronic device. In some other implementations, functions of the rendering processing module may further be implemented by other components or circuits with graphics rendering functions.

In a possible design, the first rendering instruction further includes: performing multisampling on an image obtained by the first rendering operation. Based on the solution, an example of a solution for improving image display quality while reducing power consumption is provided. In this example, the electronic device may use a multisampling technology for an image obtained by executing a rendering operation at a lower resolution to reduce jagged edges of the image and improve overall display quality of the image.

According to a second aspect, an image processing apparatus is provided, which is applicable to rendering processing of a first image by an electronic device. The electronic device runs an application program, the electronic device calls one or more frame buffers when rendering the first image, and a rendering operation of the electronic device to execute the rendering processing on the first image is issued by the application program. The apparatus includes: a determining unit, configured to determine a first primary scene in a process of executing rendering processing on a first image, where the first primary scene is a frame buffer that executes a largest quantity of rendering operations in the process of rendering the first image by the electronic device; a configuration unit, configured to configure a temporary frame buffer, where resolution of the temporary frame buffer is less than resolution of the first primary scene; and an execution unit, configured to execute a first rendering operation on the temporary frame buffer when rendering processing is performed on the first image, where the first rendering operation is a rendering operation executed on the first primary scene indicated by an application program.

In a possible design, the determining unit is further configured to determine the first primary scene based on the frame buffer that executes a largest quantity of rendering operations in a process of rendering a second image. Rendering processing of the second image is executed before the rendering processing of the first image; and the first primary scene is called when the rendering processing is executed on the second image.

In a possible design, the determining unit is further configured to determine a quantity of drawcalls (drawcalls) executed on each frame buffer in the process of rendering the second image, and determine a frame buffer that executes a largest quantity of drawcalls as the first primary scene.

In a possible design, the second image is a previous frame of image of the first image.

In a possible design, the function of the execution unit may be implemented by a processor and a rendering processing module. For example, in a case that a rendering command for the first image is received from the application program, the processor is configured to issue a first rendering instruction to the rendering processing module, where the first rendering instruction includes the first rendering operation, and the first rendering instruction is used for instructing the rendering processing module to execute the first rendering operation on the temporary frame buffer. The rendering processing module is configured to execute the first rendering operation on the temporary frame buffer based on the first rendering instruction.

In a possible design, the processor is further configured to replace frame buffer information bound to the currently executed rendering command from first frame buffer information to second frame buffer information in a case that the currently executed rendering command is determined as a rendering command for the primary scene before the processor issues the first rendering instruction to the rendering processing module, to obtain the first rendering instruction. The first frame buffer information is used for indicating that the first rendering operation is executed on the primary scene, and the second frame buffer information is used for indicating that the first rendering operation is executed on the temporary frame buffer.

In a possible design, the first frame buffer information includes a first frame buffer object, where the first frame buffer object is a frame buffer object corresponding to the primary scene, and the second frame buffer information includes a second frame buffer object, where the second frame buffer object is a frame buffer object corresponding to the temporary frame buffer.

In a possible design, the rendering command is issued by the application program to the processor, and the rendering command includes the first rendering operation and the first frame buffer information.

In a possible design, the processor is a central processing unit (CPU).

In a possible design, the rendering processing module is a graphics processing unit (GPU).

In a possible design, the first rendering instruction further includes: performing multisampling on an image obtained by the first rendering operation.

According to a third aspect, an electronic device is provided, including one or more processors and one or more memories; where the one or more memories are coupled to the one or more processors, and the one or more memories store computer instructions; and when the one or more processors execute the computer instructions, the electronic device is enabled to perform the image processing method according to the first aspect and any one of various possible designs.

According to a fourth aspect, a chip system is provided, including an interface circuit and a processor, where the interface circuit is connected to the processor through a line; the interface circuit is configured to receive a signal from a memory and send the signal to the processor, where the signal include computer instructions stored in the memory; and when the processor executes the computer instructions, the chip system performs the image processing method according to the first aspect and any one of various possible designs.

According to a fifth aspect, a computer-readable storage medium is provided, including computer instructions, and when the computer instructions are running, the image processing method according to the first aspect and any one of various possible designs is performed.

According to a sixth aspect, a computer program product is provided, including instructions, and when the computer program product runs on a computer, the computer is enabled to perform the image processing method according to the first aspect and any one of various possible designs according to the instructions.

It is to be understood that the technical features of the technical solutions provided in the second aspect, third aspect, fourth aspect, and the fifth aspect above can all correspond to the image processing method provided in the first aspect and any possible design thereof, so the similar beneficial effects can be achieved. Details are not described herein again.

BRIEF DESCRIPTION OF DRAWINGS

FIG. 5 is a schematic composition diagram of software of an electronic device according to an embodiment of this application;

FIG. 6C is a schematic diagram of image rendering according to an embodiment of this application;

FIG. 7A is a schematic flowchart of an image processing method according to an embodiment of this application;

FIG. 7B is a schematic diagram of determining a quantity of drawcalls on different frame buffers according to an embodiment of this application;

DESCRIPTION OF EMBODIMENTS

When a user uses an electronic device, the electronic device can display a multimedia stream file to the user through a display screen, so as to provide the user with a rich visual experience.

Figure 1:
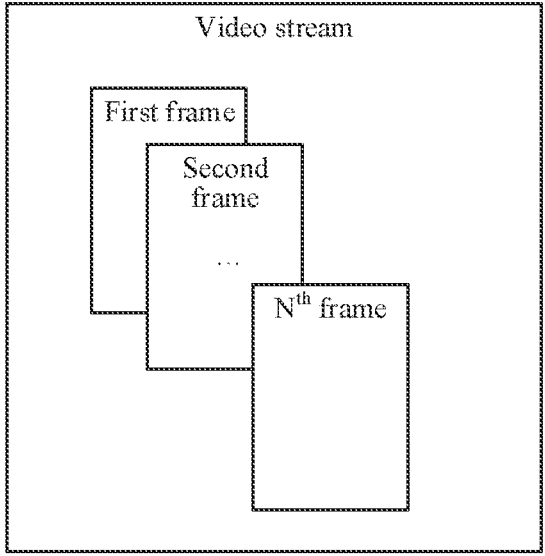
FIG. 1 is a schematic composition diagram of a video stream.

For example, the multimedia stream is a video stream. The video stream may include a plurality of frames of images. For example, with reference to FIG. 1, the video stream may include N frames of images, such as the first frame, the second frame, . . . , and the $N^{th}$ frame. When displaying the video stream, the electronic device may respectively display the first frame, the second frame, . . . , and the $N^{th}$ frame on the display screen. When a frequency of the electronic device switching and displaying frames of images is higher than a frequency that can be distinguished by human eyes, it is possible to realize that the user does not perceive the switching and displaying of different frames of images, thereby obtaining a continuous viewing effect.

An application program that wants to play the video stream may issue rendering commands to the electronic device for different frames of images. The electronic device can render each frame of image based on the rendering commands, and display each frame of image based on rendering results.

In some implementations, when a current frame of image is displayed, the electronic device can render a subsequent frame of image based on the rendering command issued by the application program, so that when the subsequent frame of image needs to be displayed, the currently displayed frame of image may be replaced with a rendered frame of image that needs to be displayed to the user.

Figure 2:
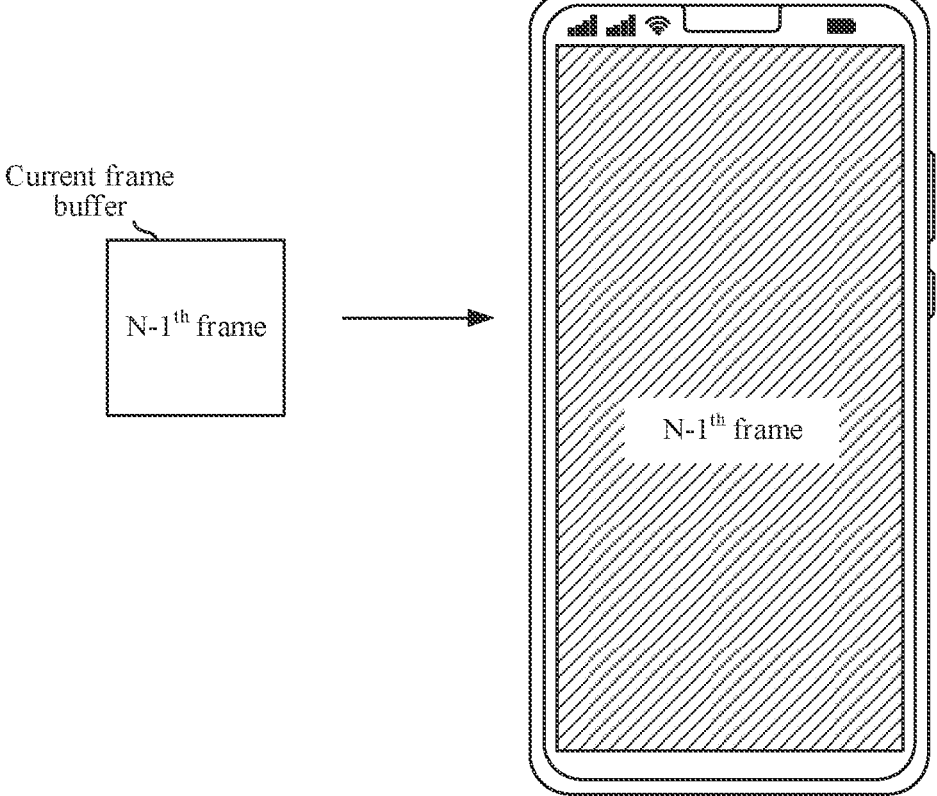
FIG. 2 is a schematic diagram of an image display.

For example, the currently displayed frame of image is the $(N-1)^{th}$ frame of image. As shown in FIG. 2, when the $(N-1)^{th}$ frame of image needs to be displayed, the electronic device can control the display screen to read data of the $(N-1)^{th}$ frame of image from the current frame buffer (for example, the current frame buffer shown in FIG. 2) for display. The current frame buffer may be a storage space configured by the electronic device in a memory for a frame of image that needs to be displayed currently, and the current frame buffer may be used for storing data (such as color data and depth data of each pixel) of the frame of image that needs to be currently displayed. That is to say, when the $(N-1)^{th}$ frame of image needs to be displayed, the electronic device can control the display screen to display the $(N-1)^{th}$ frame of image according to the data of the $(N-1)^{th}$ frame of image stored in the current frame buffer.

In some implementations, when the $(N-1)^{th}$ frame of image is displayed, the electronic device can render the subsequent image (such as the $N^{th}$ frame) to be displayed based on the rendering command issued by the application program, to obtain data for displaying the $N^{th}$ frame of image.

Figure 3:
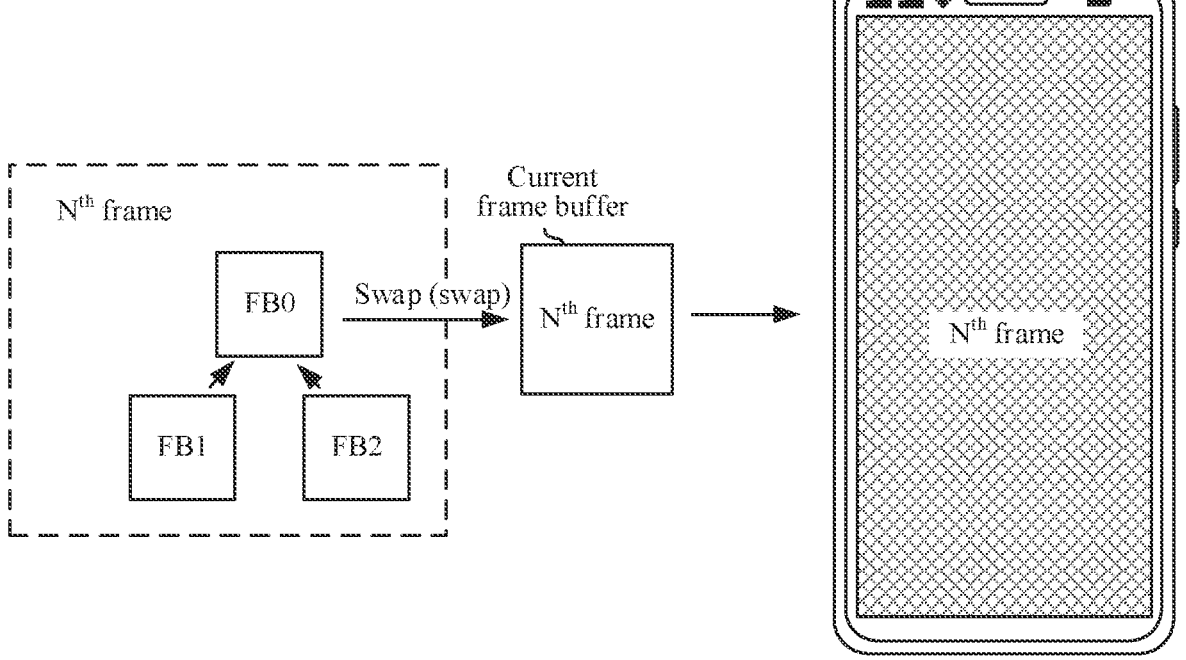
FIG. 3 is a schematic diagram of another image display.

Referring to FIG. 3, when the $(N-1)^{th}$ frame of image is displayed, the electronic device can render the $N^{th}$ frame. It may be understood that, in a process of rendering the frame of image, the electronic device needs to store a rendered result for subsequent use. Therefore, in this example, the electronic device can configure a frame buffer in the memory before rendering the $N^{th}$ frame of image. The frame buffer can correspond to a storage space in the memory. When the electronic device performs rendering, a rendering result may be stored in a corresponding frame buffer.

In some embodiments, to avoid executing too many operations on one frame buffer, the electronic device may call a plurality of frame buffers when rendering one frame of image. For example, the electronic device may call three frame buffers (such as FB0, FB1, and FB2) as shown in FIG. 3 when rendering the $N^{th}$ frame of image. In this way, when the $N^{th}$ frame of image is rendered, FB1 may be used for storing a rendering result (for example, referred to as a rendering result 1) of some elements of the $N^{th}$ frame of image, and FB2 may be used for storing a rendering result (for example, referred to as a rendering result 2) of another part of the elements of the $N^{th}$ frame of image. After the rendering result 1 and the rendering result 2 are obtained respectively, the electronic device may fuse (or referred to as rendering) the rendering result 1 and the rendering result 2 into FB0. In this way, a complete rendering result of the $N^{th}$ frame of image can be obtained in FB0.

When the $N^{th}$ frame of image needs to be displayed, the electronic device can control data in FB0 to swap (swap) to the current frame buffer, and then control the display screen to display the $N^{th}$ frame of image according to data (such as data of the $N^{th}$ frame) in the current frame buffer after the swapping.

It should be noted that, to completely render the frame of image, the electronic device may configure a corresponding resolution for the frame buffer when the frame buffer is created. A higher resolution indicates a larger storage space corresponding to the frame buffer, enabling rendering of an image with a higher resolution.

It may be understood that with the development of an electronic device, a requirement of a user for display resolution provided by the electronic device is increasingly high. Rendering of each frame of image requires rendering at a higher resolution, which further imposes a higher requirement on an image processing capability of the electronic device. Therefore, there are significant increases in power consumption and heat generation of the electronic device, affecting user experience.

To solve the foregoing problems, the embodiments of this application provide an image processing method, which can enable the electronic device to flexibly adjust a rendering mechanism of a subsequent frame of image according to a rendering situation of a rendered frame of image. For example, resolution of a frame buffer used in a process of rendering the subsequent frame of image is adjusted, thereby reducing larger pressure on a memory and computing power in the process of rendering the frame of image, and then avoiding increases in heat generation and power consumption of the electronic device.

The solution provided in the embodiments of this application is described below in detail with reference to the accompanying drawings.

It should be noted that, the image processing method provided in the embodiments of this application may be applicable to an electronic device of a user. The electronic device may be a device capable of providing network access. For example, the electronic device may be a portable mobile device with a photographing function such as a mobile phone, a tablet computer, a personal digital assistant (personal digital assistant, PDA), an augmented reality (augmented reality, AR)\virtual reality (virtual reality, VR) device, and a media player, or the electronic device may be a wearable electronic device such as a smartwatch. A specific form of the device is not particularly limited in the embodiments of this application. In some embodiments, the electronic device may include display functions. For example, the electronic device can render an image based on a rendering command issued by an application program, and display a corresponding image to a user based on a rendering result obtained through rendering.

Figure 4:
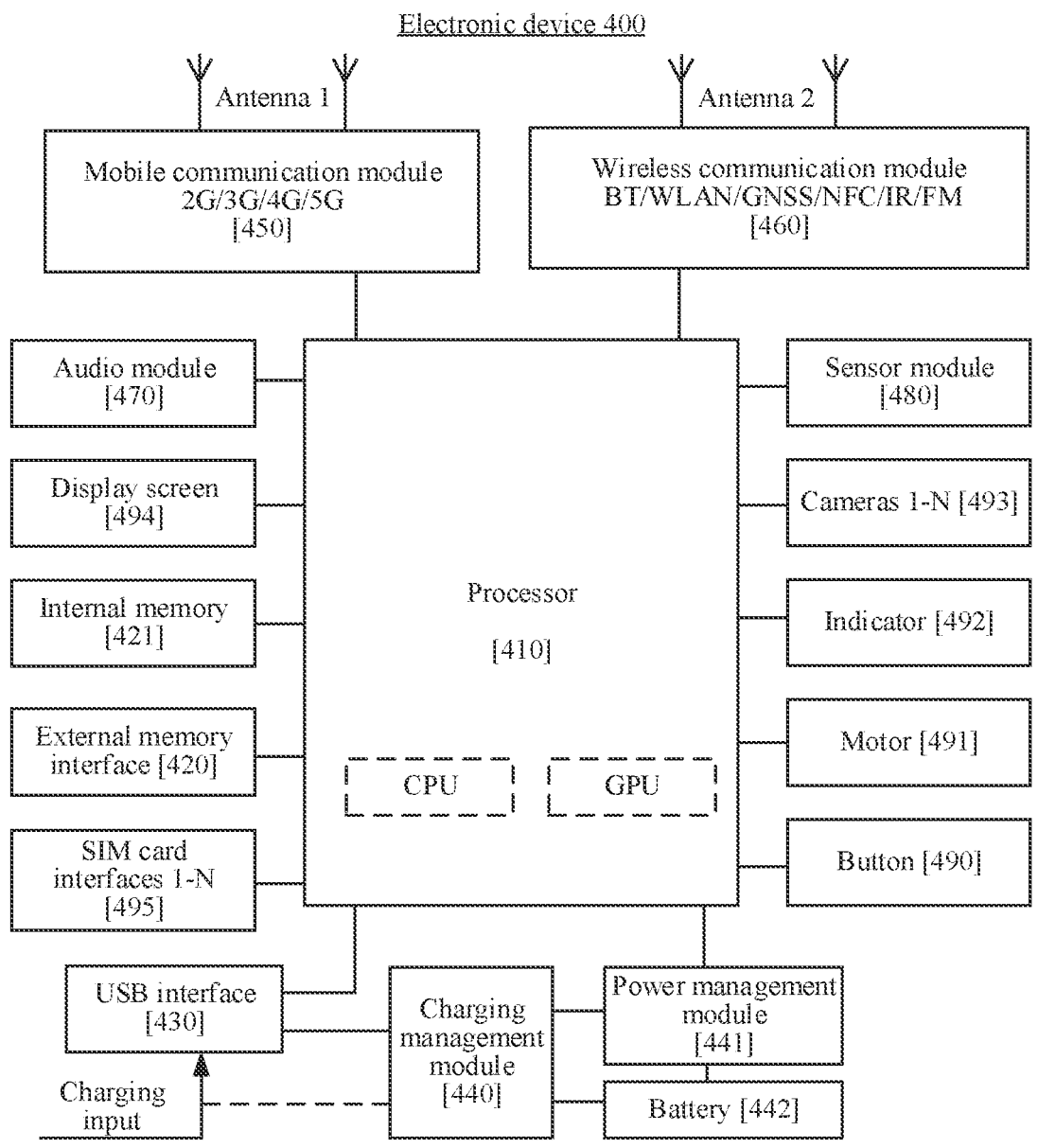
FIG. 4 is a schematic composition diagram of an electronic device according to an embodiment of this application.

FIG. 4 is a schematic composition diagram of an electronic device 400 according to an embodiment of this application. As shown in FIG. 4, the electronic device 400 may include a processor 410, an external memory interface 420, an internal memory 421, a universal serial bus (universal serial bus, USB) interface 430, a charging management module 440, a power management module 441, a battery 442, an antenna 1, an antenna 2, a mobile communication module 450, a wireless communication module 460, an audio module 470, a sensor module 480, a key 490, a motor 491, an indicator 492, a camera 493, a display screen 494, and a subscriber identification module (subscriber identification module, SIM) card interface 495. The sensor module 480 may include a pressure sensor, a gyro sensor, a barometric pressure sensor, a magnetic sensor, an acceleration sensor, a distance sensor, an optical proximity sensor, a fingerprint sensor, a temperature sensor, and a touch sensor, an ambient light sensor, a bone conduction sensor, and the like. In some embodiments, the electronic device 400 may further include devices such as a speaker, a telephone receiver, a microphone, and a headset jack for implementing audio-related functions of the electronic device.

It may be understood that the schematic structure in this embodiment constitutes no specific limitation on the electronic device 400. In some other embodiments, the electronic device 400 may include more or fewer components than those shown in the figure, or some components may be combined, or some components may be split, or components are arranged in different manners. The components in the figure may be implemented by hardware, software, or a combination of software and hardware.

The processor 410 may include one or more processing units. For example, the processor 410 may include a central processing unit/processor (Central Processing Unit/Processor, CPU), an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 400. The controller may generate an operation control signal based on an instruction operation code and a timing signal, and read an instruction and control execution of the instruction.

A memory may be further configured in the processor 410, to store an instruction and data. In some embodiments, the memory in the processor 410 is a cache memory. The memory may store an instruction or data that is recently used or cyclically used by the processor 410. If the processor 410 needs to use the instruction or the data again, the processor 410 may directly invoke the instruction or the data from the memory, to avoid repeated access and reduce a waiting time of the processor 410, thereby improving system efficiency.

In some embodiments, the processor 410 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, and the like.

The electronic device 400 can implement a photographing function by using the ISP, the camera 493, the video codec, the GPU, the display screen 494, the application processor 410, and the like.

The ISP is configured to process data fed back by the camera 493. For example, during photographing, a shutter is enabled. Light is transferred to a photosensitive element of the camera 493 through a lens, and an optical signal is converted into an electrical signal. The photosensitive element of the camera 493 transfers the electrical signal to the ISP for processing, and therefore, the electrical signal is converted into an image visible to a naked eye. The ISP may also perform algorithm optimization on noise points, brightness, and skin tone of the image. The ISP may also optimize parameters such as exposure and a color temperature of a photographed scene. In some embodiments, the ISP may be arranged in the camera 493.

The camera 493 is configured to capture a static image or a video. An optical image of an object is generated through a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into a standard image signal in a format such as RGB or YUV. In some embodiments, the electronic device 400 may include 1 or N cameras 493, and N is a positive integer greater than 1.

The digital signal processor 410 is configured to process a digital signal, and in addition to a digital image signal, the digital signal processor may further process another digital signal. For example, when the electronic device 400 performs frequency selection, the digital signal processor 410 is configured to perform Fourier transform and the like on frequency energy.

The video codec is configured to compress or decompress a digital video. The electronic device 400 may support one or more video codecs. In this way, the electronic device 400 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor 410, quickly processes input information by referring to a structure of a biological neural network, for example, a transmission mode between neurons in a human brain, and may further continuously perform self-learning. The NPU may be used to implement an application such as intelligent cognition of the electronic device 400, for example, image recognition, facial recognition, voice recognition, and text understanding.

The charging management module 440 is configured to receive a charging input from a charger. The charger may be a wireless charger or may be a wired charger. In some embodiments of wired charging, the charging management module 440 may receive charging input of a wired charger by using the USB interface 430. In some embodiments of wireless charging, the charging management module 440 may receive wireless charging input by using a wireless charging coil of the electronic device 400. When charging the battery 442, the charging management module 440 may further supply power to the electronic device 400 by using the power management module 441. The power management module 441 is configured to connect to the battery 442, the charging management module 440, and the processor 410. The power management module 441 receives input from the battery 442 and/or the charging management module 440, to supply power to the processor 410, the internal memory 421, an external memory, the display screen 494, the camera 493, the wireless communication module 460, and the like. The power management module 441 may be further configured to monitor a parameter such as a capacity of the battery 442, a cycle count of the battery 442, or a health state (electric leakage and impedance) of the battery 442. In some other embodiments, the power management module 441 may be alternatively disposed in the processor 410. In some other embodiments, the power management unit 441 and the charging management module 440 may further be configured in a same device.

A wireless communication function of the electronic device 400 may be implemented by using the antenna 1, the antenna 2, the mobile communication module 450, the wireless communication module 460, the modem processor, the baseband processor, and the like.

The antenna 1 and the antenna 2 are configured to transmit and receive an electromagnetic wave signal. Each antenna of the electronic device 400 may be configured to cover one or more communication frequency bands. Different antennas may further be multiplexed to improve utilization of the antennas. For example, the antenna 1 may be multiplexed into a diversity antenna of a wireless local area network. In some other embodiments, the antenna may be used in combination with a tuning switch.

The mobile communication module 450 may provide a solution to wireless communication such as 2G/3G/4G/5G applied to the electronic device 400. The mobile communication module 450 may include at least one filter, a switch, a power amplifier, a low noise amplifier (low noise amplifier, LNA), and the like. The mobile communication module 450 may receive an electromagnetic wave through the antenna 1, perform processing such as filtering and amplification on the received electromagnetic wave, and transmit a processed electromagnetic wave to the modem processor for demodulation. The mobile communication module 450 may further amplify a signal modulated by the modem processor, and convert the signal into an electromagnetic wave for radiation through the antenna 1. In some embodiments, at least some function modules of the mobile communication module 450 may be disposed in the processor 410. In some embodiments, at least some functional modules of the mobile communication module 450 may be configured in a same device as at least some modules of the processor 410.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Then, the demodulator transmits the demodulated low-frequency baseband signal to the baseband processor for processing. The low-frequency baseband signal is processed by the baseband processor and then transmitted to an application processor. The application processor outputs a sound signal via an audio device (that is not limited to a speaker, a telephone receiver, and the like), or displays an image or a video via a display screen 494. In some embodiments, the modem processor may be an independent device. In some other embodiments, the modem processor may be independent of the processor 410, and the modem processor and the mobile communication module 450 or another function module may be disposed in a same component.

The wireless communication module 460 may provide a solution for wireless communication solution including a wireless local area network (wireless local area network, WLAN) (for example, a wireless fidelity (wireless fidelity, Wi-Fi) network), Bluetooth (Bluetooth, BT), and a global navigation satellite system (global navigation satellite system, GNSS), frequency modulation (frequency modulation, FM), a near field communication (near field communication, NFC) technology, an infrared (infrared, IR) technology, and the like to be applied to the electronic device 400. The wireless communication module 460 may be one or more components into which at least one communication processing module is integrated. The wireless communication module 460 receives an electromagnetic wave by using the antenna 2, performs frequency modulation and filtering processing on an electromagnetic wave signal, and sends a processed signal to the processor 410. The wireless communication module 460 may alternatively receive a to-be-sent signal from the processor 410, perform frequency modulation and amplification on the to-be-sent signal, and convert the signal into an electromagnetic wave for radiation by using the antenna 2.

In some embodiments, in the electronic device 400, the antenna 1 is coupled to the mobile communication module 450, and the antenna 2 is coupled to the wireless communication module 460, so that the electronic device 400 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies, and the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS) and/or satellite-based augmentation systems (satellite based augmentation systems. SBAS).

The electronic device 400 implements a display function by using the GPU, the display screen 494, the application processor, and the like. The GPU is a microprocessor for image processing, and is connected to the display screen 494 and the application processor. The GPU is configured to perform mathematical and geometric calculations and to render graphics. The processor 410 may include one or more GPUs and execute program instructions to generate or change display information.

The display screen 494 is configured to display an image, a video, or the like. The display 494 includes a display panel. The display panel may be a liquid crystal display (liquid crystal display, LCD) 494, an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, quantum dot light emitting diodes (quantum dot light emitting diodes, QLED), and the like. In some embodiments, the electronic device 400 may include 1 or N display screens 494, and N is a positive integer greater than 1.

The external memory interface 420 may be configured to connect to an external storage card such as a micro SD card, to expand a storage capability of the electronic device 400. The external storage card communicates with the processor 410 by using the external memory interface 420, so as to implement a data storage function, such as storing a file such as music or a video in the external storage card.

The internal memory 421 may be configured to store computer executable program code, and the executable program code includes an instruction. The processor 410 runs the instruction stored in the internal memory 421, to perform various function applications and data processing of the electronic device 400. The internal memory 421 may include a program storage region and a data storage region. The program storage area may store an operating system, an application program required by at least one function (for example, a sound playback function and an image display function), and the like. The data storage region may store data (for example, audio data and an address book) and the like created when the electronic device 400 is used. In addition, the internal memory 421 may include a high-speed random access memory, and may further include a nonvolatile memory, for example, at least one disk storage device, a flash memory device, or a universal flash storage (universal flash storage, UFS).

In the embodiments of this application, the internal memory 421 may further be referred to as a memory. In some embodiments, a processor (such as a CPU) may create corresponding frame buffers in the memory for rendering processing of different frames of images. For example, with reference to FIG. 3, the CPU can create FB0, FB1 and FB2 in the memory under the control of a command of an application program to render the N$^{th}$ frame of image.

The electronic device 400 may implement an audio function by using the audio module 470, the speaker, the telephone receiver, the microphone, the headset jack, the application processor 410, and the like, for example, music playing or recording.

The audio module 470 is configured to convert digital audio information into an analog audio signal output, and is further configured to convert an analog audio input into a digital audio signal. The audio module 470 may be further configured to encode and decode an audio signal. In some embodiments, the audio module 470 may be disposed in the processor 410, or some function modules of the audio module 470 are disposed in the processor 410. The speaker, also referred to as a "horn", is configured to convert an audio electrical signal into a sound signal. The electronic device 400 may listen to music or listen to a hands-free call through the speaker. The telephone receiver, also referred to as a "receiver", is configured to convert an audio electrical signal into a sound signal. When the electronic device 400 is configured to answer a call or receive voice information, the telephone receiver may be put close to a human ear, to receive a voice. The microphone, also referred to as a "mike" or a "mic", is configured to convert a sound signal into an electrical signal. When making a call or sending voice information or requiring a voice assistant to trigger the electronic device 400 to perform some functions, a user may speak with the mouth approaching the microphone, to input a sound signal to the microphone. At least one microphone may be arranged in the electronic device 400. In some other embodiments, two microphones may be disposed in the electronic device 400, to collect a sound signal and implement a noise reduction function. In some other embodiments, three, four, or more microphones may be alternatively disposed in the electronic device 400, to collect a sound signal, implement noise reduction, recognize a sound source, implement a directional recording function, and the like. The headset jack is configured to be connected to a wired earphone. The headset jack may be a USB interface 430, or may be a 3.5 mm open mobile terminal 400 platform (open mobile terminal platform, OMTP) standard interface or cellular telecommunications industry association of the USA (cellular telecommunications industry association of the USA, CTIA) standard interface.

The touch sensor is also referred to as a "touch panel". The touch sensor may be disposed on the display screen 494. The touch sensor and the display screen 494 form a touchscreen, which is also referred to as a "touch control screen". The touch sensor is configured to detect a touch operation performed on or near the touch sensor. The touch sensor may transfer the detected touch operation to the application processor 410, to determine a touch event type. In some embodiments, the touch sensor may provide a visual output related to the touch operation by using the display screen 494. In some other embodiments, the touch sensor may be alternatively disposed on a surface of the electronic device 400, and is located on a position different from that of the display screen 494.

The pressure sensor is configured to sense a pressure signal, and may convert the pressure signal into an electrical signal. In some embodiments, the pressure sensor may be disposed in the display screen 494. There are a plurality of types of pressure sensors, for example, a resistive pressure sensor, an inductive pressure sensor, and a capacitive pressure sensor. The capacitive pressure sensor may include at least two parallel plates having conductive materials. When force is exerted on the pressure sensor, capacitance between electrodes changes. The electronic device 400 determines pressure strength based on a change in the capacitance. When a touch operation is performed on the display screen 494, the electronic device 400 detects strength of the touch operation by using the pressure sensor. The electronic device 400 may further calculate a position of the touch based on a detection signal of the pressure sensor. In some embodiments, touch operations that are performed on a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor may be configured to determine a motion posture of the electronic device 400. In some embodiments, an angular velocity of the electronic device 400 around three axes (that is, x, y, and z axes) may be determined through the gyroscope sensor. The gyroscope sensor may be used for image stabilization in photographing. For example, when the shutter is pressed, the gyro sensor detects an angle at which the electronic device 400 jitters, and calculates, based on the angle, a distance for which a lens module needs to compensate, and allows the lens to cancel the jitter of the electronic device 400 through reverse motion, thereby implementing image stabilization. The gyroscope sensor may also be used in navigation and motion sensing games.

The barometric pressure sensor is configured to measure barometric pressure. In some embodiments, the electronic device 400 calculates an altitude by using the air pressure value measured by the barometric pressure sensor, and assists positioning and navigation.

The magnetic sensor includes a Hall effect sensor. The electronic device 400 may detect an opening state or a closing state of a flip leather case by using the magnetic sensor. In some embodiments, when the electronic device 400 is a clamshell phone, the electronic device 400 may detect opening and closing of a flip by using the magnetic sensor. Further, features such as automatic unlocking of the flip cover are set based on the detected opening and closing states of the leather case or opening and closing states of the flip cover.

The acceleration sensor may detect an acceleration value of the electronic device 400 in each direction (generally three axes). When the electronic device 400 is stationary, a magnitude and a direction of gravity may be detected. The acceleration sensor may be further configured to recognize a posture of the electronic device 400, and is applied to switching between landscape orientation and portrait orientation, and applied to an application such as a pedometer.

The distance sensor is configured to measure a distance. The electronic device 400 may measure a distance by infrared light or laser. In some embodiments, in a photographing scenario, the electronic device 400 may measure a distance by using the distance sensor, to implement quick focusing.

The optical proximity sensor may include, for example, a light emitting diode (LED) and an optical detector, for example, a photodiode. The light emitting diode may be an infrared light emitting diode. The electronic device 400 emits infrared light by using the light emitting diode. The electronic device 400 detects infrared reflected light from a nearby object by using the photodiode. When sufficient reflected light is detected, it may be determined that there is an object near the electronic device 400. When detecting insufficient reflected light, the electronic device 400 may determine that there is no object near the electronic device 400. The electronic device 400 may detect, by using the optical proximity sensor, that a user holds the electronic device 400 close to an ear for a call, so that automatic screen-off is implemented to achieve power saving. The optical proximity sensor may be further configured to automatically unlock and lock the screen in a leather cover mode and a pocket mode.

The ambient light sensor is configured to sense a brightness of ambient light. The electronic device 400 may adaptively adjust a luminance of the display screen 494 according to the perceived ambient light brightness. The ambient light sensor may also be configured to automatically adjust white balance during photographing. The ambient light sensor may further cooperate with the optical proximity sensor to detect whether the electronic device 400 is in a pocket to prevent a false touch.

The fingerprint sensor is configured to collect a fingerprint. The electronic device 400 may use a feature of the collected fingerprint to implement fingerprint-based unlocking, application lock access, fingerprint-based photographing, fingerprint-based call answering, and the like.

The temperature sensor is configured to detect temperature. In some embodiments, the electronic device 400 executes a temperature processing policy by using temperature detected by the temperature sensor. For example, when the temperature reported by the temperature sensor exceeds a threshold, the electronic device 400 reduces performance of a processor 410 located near the temperature sensor, so as to reduce power consumption and implement thermal protection. In some other embodiments, when the temperature is lower than another threshold, the electronic device 400 heats the battery 442, to avoid an abnormal shutdown of the electronic device 400 caused by a low temperature. In some other embodiments, when the temperature is below still another threshold, the electronic device 400 boosts an output voltage of the battery 442 to prevent abnormal shutdown caused by the low temperature.

The bone conduction sensor may obtain a vibration signal. In some embodiments, the bone conduction sensor may obtain a vibration signal of a vibration bone of a human vocal-cord part. The bone conduction sensor may alternatively contact a human pulse, and receive a blood pressure beating signal. In some embodiments, the bone conduction sensor may be alternatively disposed in a headset, to form a bone conduction headset. The audio module 470 may obtain a voice signal through parsing based on the vibration signal, of the vibration bone of the vocal-cord part, that is obtained by the bone conduction sensor, to implement a voice function. The application processor 410 may parse heart rate information based on the blood pressure beating signal obtained by the bone conduction sensor, to implement a heart rate detection function.

The key 490 includes a power key, a volume key, and the like. The key 490 may be a mechanical key 490, or a touch-type key 490. The electronic device 400 may receive a key 490 input, and generate a key signal input related to user setting and function control of the electronic device 400.

The motor 491 may generate a vibration prompt. The motor 491 may be configured to provide a vibration prompt for an incoming call, and may be further configured to provide a touch vibration feedback. For example, touch operations performed on different applications (for example, photo taking and audio playing) may correspond to different vibration feedback effects. The motor 491 may further correspond to different vibration feedback effects for touch operations applied to different areas of the display screen 494. Different application scenarios (for example, a time reminder, information receiving, an alarm clock, and a game) may further correspond to different vibration feedback effects. Customization of a touch vibration feedback effect may also be supported.

The indicator 492 may be an indicator light, may be configured to indicate a charging state and a battery change, and may be further configured to indicate a message, a missed call, a notification, and the like.

The SIM card interface 495 is configured to connect to a SIM card. The SIM card may be inserted into the SIM card interface 495 or plugged from the SIM card interface 495, to come into contact with or be separated from the electronic device 400. The electronic device 400 may support one or N SIM card interfaces 495, and N is a positive integer greater than 1. The SIM card interface 495 can support a Nano SIM card, a Micro SIM card, a SIM card, and the like. A plurality of cards may be inserted into a same SIM card interface 495 at the same time. The plurality of cards may be of a same type or different types. The SIM card interface 495 may be further compatible with different types of SIM cards. The SIM card interface 495 may also be compatible with an external memory card. The electronic device 400 interacts with a network by using a SIM card, to implement functions such as a call and data communication. In some embodiments, the electronic device 400 uses an eSIM, that is, an embedded SIM card. The eSIM card may be embedded in the electronic device 400 and cannot be separated from the electronic device 400.

It should be understood that FIG. 4 shows a hardware structure composition of an electronic device. In this application, the electronic device 400 may also be divided from another perspective. For example, FIG. 5 shows another logical composition of the electronic device 400.

For example, in the example shown in FIG. 5, the electronic device 400 may have a layered architecture. In this example, in the layered architecture, software is divided into several layers, and each layer has a clear role and task. The layers communicate with each other through a software interface. In some embodiments, an electronic device running an Android® (Android) operating system is used as an example. The system may be divided into five layers that are respectively an application layer, an application framework layer, an Android runtime (Android runtime, ART), a native C/C++ library, a hardware abstract layer (hardware abstract layer, HAL), and a kernel layer from top to bottom.

The application layer may include a series of application packages. As shown in FIG. 5, the application packages may include application programs such as camera, gallery, calendar, phone, map, navigation, WLAN, Bluetooth, music, video, and short message.

In some embodiments of this application, the application layer may include application programs that provide a user with a multimedia stream display function. For example, the application layer may include various game applications (such as Peacekeeper Elite®, Honor of Kings®). For another example, the application layer may also include various video applications (such as iQIYI®). When the application programs are running, a rendering command may be issued, so that the CPU can control the GPU to perform corresponding rendering based on the rendering command, to obtain data of each frame of image.

The application framework layer provides an application programming interface (application programming interface, API) and a programming framework for application programs at the application layer. The application framework layer includes some predefined functions. As shown in FIG. 5, the application framework layer may include a window manager, a content provider, a view system, a resource manager, a notification manager, an activity manager, an input manager, and the like. The window manager provides a window manager service (Window Manager Service, WMS), and the WMS may be used for window management, window animation management, surface management, and as a transfer station for an input system. The content provider is configured to store and obtain data, so that the data can be accessed by an application program. The data may include a video, an image, audio, calls made and answered, a browsing history and a bookmark, an address book, and the like. The view system includes visual controls such as a control for displaying a text and a control for displaying a picture. The view system may be configured to construct an application program. A display interface may be formed by one or more views. For example, a display interface including a short message notification icon may include a view for displaying a text and a view for displaying a picture. The resource manager provides various resources such as a localized character string, an icon, a picture, a layout file, and a video file for an application program. The notification manager enables an application program to display notification information on a status bar. The notification information may be a message used for indicating a notification type, and may automatically disappear after a short stay without interacting with a user. For example, the notification manager is configured to notify download completion, a message prompt, and the like. The notification manager may alternatively be a notification that appears on a top status bar of the system in a form of a graph or a scroll bar text, for example, a notification of an application program running on the background, or may be a notification that appears on the screen in a form of a dialog window. For example, text information is prompted on the status bar, a prompt tone is made, the electronic device vibrates, or an indicator light flashes. The activity manager can provide an activity manager service (Activity Manager Service, AMS), and the AMS can be used for starting, switching, scheduling system components (such as an activity, a service, a content provider, a broadcast receiver), and managing and scheduling an application process. The input manager can provide an input manager service (Input Manager Service, IMS), and the IMS can be used for inputs of a management system, such as a touch screen input, a key input, a sensor input, and the like. The IMS fetches an event from an input device node, and distributes the event to an appropriate window through interaction with the WMS.

The Android runtime includes a kernel library and an Android runtime. The Android runtime is responsible for converting a source code to a machine code. The Android runtime mainly includes using an ahead or time (ahead or time, AOT) compilation technology and a just in time (just in time, JIT) compilation technology. The kernel library is mainly configured to provide basic Java class library functions, for example, a basic data structure, mathematics, input output (Input Output, IO), tools, database, network and other libraries. The kernel library provides the API for the user to develop an Android application.

The native C/C++ library may include a plurality of function modules. For example, a surface manager (surface manager), a media framework (Media Framework), a standard C library (Standard C library, libc), openGL for embedded systems (OpenGL for Embedded Systems, OpenGL ES), Vulkan, SQLite, Webkit, and the like.

The surface manager is configured to manage a display subsystem, and converge 2D and 3D layers of a plurality of application programs. The media framework supports playback and recording of a plurality of common audio and video formats, a static image file, and the like. The media library may support a plurality of audio and video encoding formats, for example, moving pictures experts group4 (Moving Pictures Experts Group MPEG4), H.264, moving picture experts group audio layer3 (Moving Picture Experts Group Audio Layer3, MP3), advanced audio coding (Advanced Audio Coding, AAC), adaptive multi-rate (Adaptive Multi-Rate, AMR), joint photographic experts group (Joint Photographic Experts Group, JPEG, or referred to as JPG), portable network graphics (Portable Network Graphics, PNG), and the like. OpenGL ES and/or Vulkan provide drawing and operation of a 2D graphic and a 3D graphic in the application programs. SQLite provides a lightweight relational database for application programs of the electronic device 400.

The hardware abstraction layer runs in user space (user space), encapsulates a kernel layer drive, and provides a call interface to an upper layer. The kernel layer is a layer between hardware and software. The kernel layer includes at least a display drive, a camera drive, an audio drive, and a sensor drive.

The processing mechanism of software and hardware in the process of image rendering is exemplarily described below with reference to the composition shown in FIG. 4 and FIG. 5. For example, the processor 410 includes a CPU and a GPU. In the embodiments of this application, the CPU may be configured to receive a rendering command from an application program, and issue a corresponding rendering instruction to the GPU based on the rendering command, so that the GPU executes corresponding rendering based on the rendering instruction. As an example, the rendering command may include a bindFrameBuffer( ) function and one or more glDrawElements. Correspondingly, the rendering instruction may also include the bindFrameBuffer( ) function and one or more glDrawElements. The bindFrameBuffer( ) function may be used for indicating a currently bound frame buffer. For example, a bindFrameBuffer(1) can indicate that the currently bound frame buffer is a FB1, that is, executing subsequent glDrawElements on the FB1. For ease of description, in the following examples, a collection of the glDrawElements in the rendering command/rendering instruction is referred to as a rendering operation.

Figure 6A:
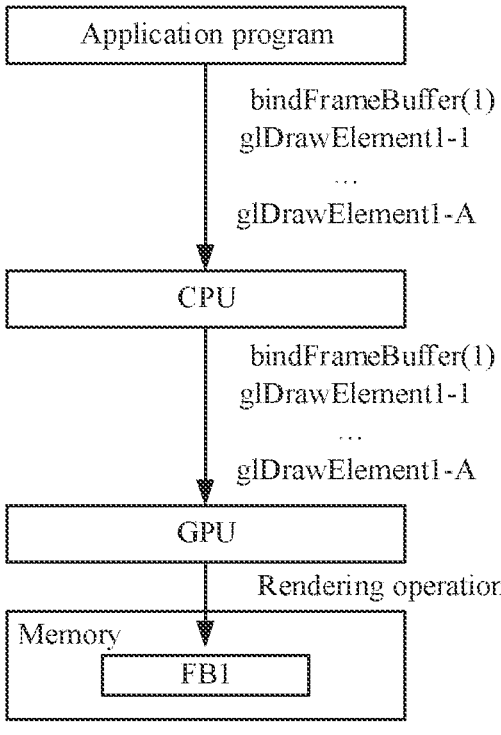
FIG. 6A is a schematic diagram of issuing a rendering command according to an embodiment of this application.

When an application program in an application layer needs to render a certain image (such as the N$^{th}$ frame of image), a rendering command may be issued. The rendering command may include a frame buffer that needs to be called for rendering the N$^{th}$ frame of image, and a rendering operation that needs to be executed in each frame buffer. In some examples, the rendering command can bind a corresponding rendering operation to the frame buffer through the bindFrameBuffer( ) function. For example, the N$^{th}$ frame of image needs to use a FB0, a FB1 and a FB2 as frame buffers. FIG. 6A is an example of a rendering command corresponding to the FB1. The rendering command issued by the application program may include the bindFrameBuffer(I) function, thereby realizing the binding of the current rendering operation to the FB1. After the FB1 is bound, a rendering operation instruction on the FB1 can be realized based on a glDrawElement instruction. In this example, one glDrawElement instruction may correspond to one drawcall. In different implementations, there may be a plurality of glDrawElement instructions executed on the FB1, and there may be a plurality of corresponding drawcalls executed on the FB1. For example, with reference to FIG. 6A, in this example, A drawcalls executed on the FB1 may be included in the rendering command, such as glDrawElement 1-glDrawElement A.

Similarly, for the rendering operation that needs to use the FB2, in the rendering instruction, the FB2 may be bound through a bindFrameBuffer(2) function. Then, the rendering operation instruction on the FB2 can be realized based on different glDrawElement instructions.

After the foregoing command is received, the CPU can issue the corresponding rendering instruction to the GPU based on the frame buffer information bound by the bindFrameBuffer( ) function and a corresponding glDrawElement instruction. Therefore, the GPU can execute a corresponding rendering operation, and store a result of the rendering operation in a currently bound frame buffer.

For example, the CPU can determine that an active (active) frame buffer is a FB1 when an instruction of the bindFrameBuffer(l) is received. The CPU can issue a rendering instruction corresponding to the glDrawElement on the FB1 to the GPU. For example, with reference to FIG. 6A, the CPU can issue rendering instructions including executing glDrawElement 1-1 to glDrawElement 1-A to the GPU, so that the GPU can execute glDrawElement 1-1 to glDrawElement 1-A. In some embodiments, the CPU may issue the bindFrameBuffer(1) to the GPU, so that the GPU may determine to execute the foregoing rendering instructions on the FB1, and store results in the FB1.

Figure 6B:
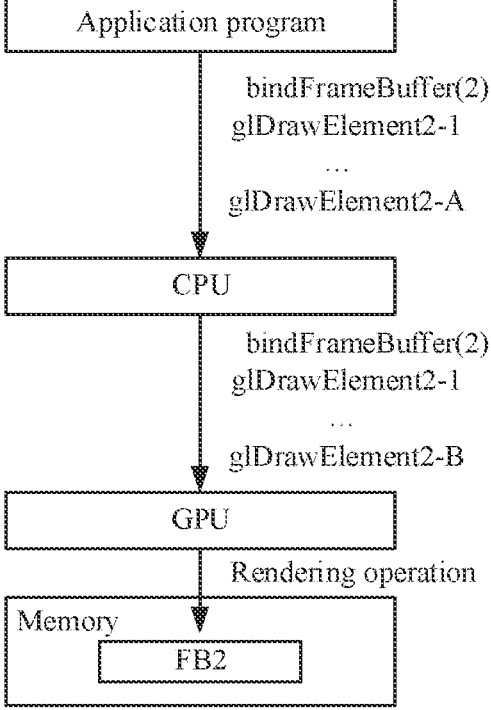
FIG. 6B is a schematic diagram of issuing a rendering command according to an embodiment of this application.

Similarly, with reference to FIG. 6B, the CPU may determine that the active (active) frame buffer is the FB2 when a command of the bindFrameBuffer(2) is received. The CPU can issue a rendering instruction corresponding to the glDrawElement on the FB2 to the GPU, thereby completing rendering of relevant data on the FB2.

In such reciprocation, rendering of each frame buffer corresponding to the N$^{th}$ frame of image may be completed.

In this way, the electronic device may render the rendering results in the frame buffers to the FB0, so that data corresponding to the N$^{th}$ frame of image may be obtained in the FB0. For example, a default frame buffer of the Nth frame of image is the FB0, and the FB1 and the FB2 are called again in the process of rendering the N$^{th}$ frame of image. Combining the examples in FIG. 6A and FIG. 6B, with reference to FIG. 6C, after the GPU completes the rendering processing on the FB1 and the FB2, corresponding data (such as color data and/or depth data of each pixel) may be stored in the FB1 and the FB2 respectively. The data (such as the data in the FB1 and the FB2) may respectively correspond to some elements of the N$^{th}$ frame of image. Then, with reference to FIG. 6C, the electronic device may render the data in the FB1 and the FB2 to the FB0. In this way, all data of the N$^{th}$ frame of image may be obtained on the FB0. When the electronic device needs to display the N$^{th}$ frame of image, with reference to the solution shown in FIG. 3, the CPU can swap the data corresponding to the N$^{th}$ frame of image from the FB0 to a current frame buffer based on a swapbuffer instruction, thereby enabling the display screen for display according to the data of the $N^{th}$ frame of image in the current frame buffer.

It should be noted that, in the foregoing example, the description is made by using an example in which full data of the $N^{th}$ frame of image is obtained by only rendering based on the rendering results of the data of the FB1 and the FB2 on the FB0. For example, the $N^{th}$ frame of image is an image rendered based on a rendering instruction issued by a game application. The $N^{th}$ frame of image may include elements such as characters and trees, or include elements such as special effects, or include elements such as user interface (User Interface, UI) controls. Then, in some embodiments, the CPU can control the GPU to render the characters, the trees, the UI controls, and other elements on the FB1 based on the rendering command issued by the game application, and store results in the FB1. The CPU can further control the GPU to render the special effects and other elements on the FB2 based on the rendering command issued by the game application, and store results in the FB2. Then, the full data of the $N^{th}$ frame of image may be obtained by rendering the data stored in the FB1 and the data stored in the FB2 to the FB0.

In some other embodiments of this application, the rendering operation executed on the FB0 may further include rendering operations executed based on rendering instructions other than the data of the FB1 and the FB2. For example, still with reference to the foregoing example, the CPU can control the GPU to render the characters, the trees, and other elements on the FB1 based on the rendering command issued by the game application, and store results in the FB1. The CPU can further control the GPU to render the special effects and other elements on the FB2 based on the rendering command issued by the game application, and store results in the FB2. Then, the CPU can further control the GPU to render the UI controls on the FB0 based on the rendering command issued by the game application, and refer to the data stored in the FB1 and the FB2 to render and fuse all the rendering results, thereby obtaining the full data of the $N^{th}$ frame of image on the FB0.

It may be understood that in the process of rendering the $N^{th}$ frame of image, quantities of drawcalls executed on different frame buffers are different. A larger quantity of drawcalls executed indicates that more rendering operations are executed on the frame buffer. Then, more computing power resources may be consumed in the rendering operation of the frame buffer, and more power consumption and heat generation may be generated.

The solution provided in the embodiments of this application enables the electronic device to automatically identify a frame buffer (for example, referred to as a primary scene) that consumes more resources in the process of rendering a frame of image that currently needs to be rendered. When the rendering operation in the primary scene is executed at a lower resolution, the computing resources consumed by the rendering operation in the primary scene can be reduced.

For example, based on correlation of consecutive frames of images, the electronic device can determine the primary scene through the process of rendering the $(N-1)^{th}$ frame of image. In some embodiments, the CPU can determine, according to a quantity of drawcalls executed on each frame buffer in a process of processing a rendered frame of image (such as the $(N-1)^{th}$ frame), a frame buffer (that is, the primary scene) that needs to execute a largest quantity of rendering operations in the process of rendering the $(N-1)^{th}$ frame of image. That is to say, when the current frame of image (such as the $N^{th}$ frame) is rendered, the quantity of rendering operations in the primary scene may also be the largest. In this example, the CPU can configure a temporary frame buffer with a smaller resolution in the memory for the primary scene when the $N^{th}$ frame of image is rendered, so that when a rendering command for the primary scene is received, the CPU can control the GPU to execute a rendering operation corresponding to the primary scene at a smaller resolution in the temporary frame buffer. In this way, in the process of rendering the $N^{th}$ frame of image, a large quantity of rendering operations may be executed at a smaller resolution, thereby reducing rendering load and reducing power consumption required for rendering.

Figure 7C:
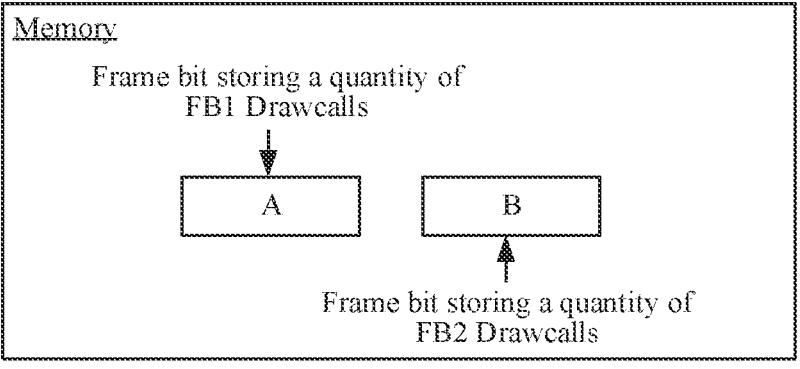
FIG. 7C is a schematic diagram of determining a quantity of drawcalls on different frame buffers according to an embodiment of this application.

The solution provided in the embodiments of this application is described below in detail with reference to the example. For example, FIG. 7A is a schematic flowchart of an image processing method according to an embodiment of this application. As shown in the figure, the method may include:

S701: Determine a primary scene in a process of rendering a previous frame of image.

The primary scene may be a frame buffer that executes a largest quantity of rendering operations in the rendering process.

It may be understood that, in an example, the electronic device plays a video stream. There is a correlation between scenes of consecutive frames of images constituting the video stream. Therefore, a processor (such as a CPU) of the electronic device can determine a primary scene of a current frame of image according to the primary scene of the previous frame of image.

For example, the frame of image currently rendered is the $N^{th}$ frame of image. The CPU can determine a primary scene of the $(N-1)^{th}$ frame of image according to a quantity of drawcalls executed on different frame buffers in the process of rendering the previous frame (such as the $(N-1)^{th}$ frame of image) of image. In some embodiments, the $N^{th}$ frame of image may also be referred to as a first image, and the primary scene of the $N^{th}$ frame of image may also be referred to as a first primary scene. Correspondingly, the $(N-1)^{th}$ frame of image may be referred to as a second image, and a primary scene of the second image may be the same as a primary scene of the first image (for example, both are the first primary scene).

As a possible implementation, for example, a default frame buffer for rendering a frame of image is FB0, and FB1 and FB2 are called in the process of rendering the $(N-1)^{th}$ frame of image. For ease of description, a rendering command issued by an application program and corresponding to the FB1 is referred to as a rendering command 1, and a rendering command issued by the application program and corresponding to the FB2 is referred to as a rendering command 2. The rendering command 1 may include a glBindFrameBuffer(1) for binding the FB1. The rendering command 1 may further include one or more glDrawElements that need to be executed on the FB1. For example, the rendering command 1 may include A glDrawElements, that is, A drawcalls. Similarly, the rendering command 2 may include a glBindFrameBuffer(2) for binding the FB2. The rendering command 2 may further include one or more glDrawElements that need to be executed on the FB2. For example, the rendering command 2 may include B glDrawElements, that is, B drawcalls.

When rendering commands for the FB1 and the FB2 are received, the CPU may count a quantity of drawcalls included in corresponding rendering commands, to obtain a quantity of drawcalls executed on each FB.

With reference to FIG. 7B, take the FB1 as an example. The CPU can initialize a counter 1 when the glBindFrame-Buffer(1) is executed based on the rendering command issued by the application program. For example, a corresponding counting frame bit is configured for the FB1 in the memory. By initializing the counter 1, a value of the frame bit may be initialized to be 0. Each time the glDrawElement is executed on the FB1, the count of the counter 1 is increased by 1, such as executing count1++. For example, after the glDrawElement1-1 is executed, the CPU can execute the count1++ on the counter 1, so that a value of a frame bit storing a quantity of FB1 Drawcalls changes from 0 to 1. That is to say, the quantity of drawcalls executed on the FB1 is 1 at this time, and so on. Then, the CPU can determine that in the process of rendering the $(N-1)^{th}$ frame of image, the quantity of drawcalls executed on the FB1 is a current count of the counter 1 (for example, the count may be A).

Similar to the FB1, the CPU can further initialize a counter 2 when the glBindFrameBuffer(2) is called based on the rendering command issued by the application program, for example, initializing count2=0. Each time the glDrawElement is subsequently executed on the FB2, the count of the counter 2 is increased by 1, such as executing count2++. After rendering processing of images on the FB2 is completed, the CPU can determine that in the process of rendering the $(N-1)^{th}$ frame of image, the quantity of drawcalls executed on the FB2 is a current count of the counter 2 (for example, the count may be B). For example, refer to FIG. 7C. After the rendering processing on the FB1 and the FB2 is completed, a value of a frame bit storing a quantity of FB1 Drawcalls in the memory may be A, and a value of a frame bit storing a quantity of FB2 Drawcalls may be B.

In this example, the CPU may select a frame buffer corresponding to a larger count in A and B as the primary scene. For example, when A is greater than B, the CPU may determine that a larger quantity of drawcalls is executed on the FB1, thereby determining that the FB1 is the primary scene of the $(N-1)^{th}$ frame of image. In contrast, when A is less than B, the CPU may determine that a larger quantity of drawcalls is executed on the FB2, thereby determining that the FB2 is the primary scene of the $(N-1)^{th}$ frame of image.

In some embodiments of this application, an execution process of S701 may be executed by the CPU in the process of rendering the $(N-1)^{th}$ frame of image.

S702: Configure a temporary frame buffer for the primary scene.

According to the descriptions in S701, the primary scene is the frame buffer that executes the largest quantity of drawcalls. Therefore, when it is necessary to reduce pressure of the rendering processing on the electronic device, the rendering processing in the primary scene may be adjusted, to achieve a more significant effect than adjusting rendering processing mechanisms in other frame buffers.

In the embodiments of this application, the CPU of the electronic device may configure a temporary frame buffer for the primary scene, and resolution of the temporary frame buffer may be less than resolution of the primary scene. Therefore, the electronic device may process a large quantity of drawcalls in the primary scene at a smaller resolution, thereby reducing impact of high-resolution rendering on the electronic device.

For example, in some embodiments, the CPU can determine the resolution of the primary scene before the temporary frame buffer is configured for the primary scene in the memory.

As a possible implementation, the CPU can determine the resolution of the primary scene according to a size of a canvas used when the $(N-1)^{th}$ frame of image is rendered. It may be understood that when the application program issues a rendering command to the CPU, the frame buffer may be bound through a bindFrameBuffer( ) function in the rendering command. Take the rendering command bound to FB1 through a bindFrameBuffer(I) as an example. In the rendering command, a drawing size may further be specified when a rendering operation is executed in the FB1 through a glViewPort(x, y) function. In this way, the CPU can control the GPU to execute subsequent rendering processing corresponding to the glDrawElement in a x*y pixel region. In this example, when the resolution of the primary scene is obtained, the CPU can determine a pixel size of the primary scene according to the pixel region specified by the glView-Port(x, y) function in the process of rendering the $(N-1)^{th}$ frame of image in the primary scene. For example, take the FB1 as the primary scene as an example. The CPU can determine that glViewPort(2218, 978) is received after the FB1 (for example, the bindFrameBuffer(1) function is received) is bound when the $(N-1)^{th}$ frame of image is rendered. Then, the CPU can determine that a 2218×978 pixel region on the FB1 is used in the process of rendering the $(N-1)^{th}$ frame of image. In this way, the CPU can determine that the resolution of the primary scene (that is, FB1) is 2218×978.

As still another possible implementation, the CPU can determine the resolution of the primary scene by executing a glGetIntegerv instruction on the primary scene after a rendering command for the $N^{th}$ frame of image is received. For example, the primary scene is the FB1 and a glGetInt-egerv(GL_VIEWPORT) instruction is executed to obtain the resolution. The CPU can execute the glGetIntegerv (GL_VIEWPORT) instruction after the $N^{th}$ frame of image is received and the FB1 (for example, the bindFrameBuffer (1) function is received) is bound. Therefore, based on the obtained result (such as tex1 (2118×978)), the resolution of the primary scene (that is, the FB1) is determined to be 2218×978.

In the embodiments of this application, the CPU can configure a temporary frame buffer with a smaller resolution for the primary scene when the resolution of the primary scene is determined. The operation of configuring the temporary frame buffer may be executed by the CPU in the process of rendering the $(N-1)^{th}$ frame of image. In some other implementations, the operation of configuring the temporary frame buffer may further be executed before the CPU completes rendering the $(N-1)^{th}$ frame of image and starts rendering the $N^{th}$ frame of image.

It should be noted that, in some embodiments of this application, the electronic device may be provided with a zoom parameter. The zoom parameter may be used for determining the resolution of the temporary frame buffer. For example, the CPU may determine the resolution of the temporary frame buffer according to the following formula (1).

$$\text{The resolution of the temporary frame buffer} = \text{the resolution of the primary scene} \times \text{zoom parameter} \qquad \text{Formula (1).}$$

The zoom parameter may be a positive number less than 1. The zoom parameter may be configured by the user, or may be preset in the electronic device, or may be obtained by the electronic device from the cloud when needed.

After the resolution of the temporary frame buffer is determined, the CPU can configure a storage space of a corresponding size for the temporary frame buffer in the memory.

In some embodiments of this application, the CPU can determine the resolution of the primary scene after the rendering processing of the $(N-1)^{th}$ frame of image is completed. Then, the resolution of the temporary frame buffer can be determined according to the foregoing formula (1). Based on this, the CPU can complete the configuration of the temporary frame buffer in the memory.

In some implementations, the CPU can configure the temporary frame buffer by creating a temporary frame buffer object and binding the temporary frame buffer object to a storage space configured in the memory. The temporary frame buffer object may be a name of the temporary frame buffer.

As an example, an example of a typical instruction stream for creating a frame buffer is provided below:

unsigned int fbo; // Define an ID of an FB, and a variable name is defined as fbo
    glGenFramebuffers(1, &fbo); // Create a FB, an ID value is fbo, and a drive assigns an ID to the FB, for example, fbo may be assigned with a value of 3
    glBindFramebuffer(GL_FRAMEBUFFER, fbo); // Bind a frame buffer 3
    unsigned int texture; // Define a texture ID, and a variable name is defined as texture
    glGenTextures(1, &texture); // Create a texture, an ID value is texture, and a driver assigns texture to the FB, for example, texture may be assigned with a value of 11
    glBindTexture(GL_TEXTURE_2D, texture); // Bind a texture 11, where GL_TEXTURE_2D is used for indicating that a texture target is a 2D texture
    glTexImage2D(GL_TEXTURE_2D, 0, GL_RGB, 800, 600, 0, GL_RGB, GL_UNSIGNED_BYTE, NULL); // Allocate a memory space of 800*600 to the texture, where the second factor (that is, 0) in the function may be used for indicating a texture level, and the third factor (that is, GL_RGB) in the function may be used for indicating a target texture format, the seventh factor in the function (that is, GL_RGB) may be used for indicating a texture format of an input parameter, and the eighth factor in the function (that is, GL_UNSIGNED_BYTE) may be used for indicating an input parameter texture data type
    glFramebufferTexture2D(GL_FRAMEBUFFER, GL_COLOR_ATTACHMENT0,GL_TEXTURE_2D,texture, 0); // Attach the created texture texture to a currently bound frame buffer object It may be understood that the temporary frame buffer is a FB3. Since resolution of the FB3 is less than resolution of the FB1, a storage space occupied by the FB3 in the memory is less than the storage space occupied by the FB1 in the memory. Correspondingly, resolution of a rendering operation executed on the FB3 is lower, that is to say, when same rendering processing is executed on the FB3, a quantity of to-be-processed pixels on the FB3 is less than a quantity of to-be-processed pixels on the FB1. Therefore, when the rendering operation is executed on the FB3, it requires lower power consumption and generates less heat than executing the rendering operation on the FB1.

In this way, after the rendering processing of the $(N-1)^{th}$ frame of image is completed and before the rendering processing of the $N^{th}$ frame of image is executed, the CPU can complete actions of determining the primary scene and configuring a corresponding temporary frame buffer for the primary scene.

S703: Execute a rendering operation of the primary scene on the temporary frame buffer.

In the embodiments of this application, the electronic device may use a frame buffer with a smaller resolution to execute a large quantity of rendering operations in the primary scene by using a processor.

For example, after a rendering command is received from an application program, the CPU may control the GPU to execute a rendering operation on a corresponding frame buffer based on the rendering command.

Figure 8:
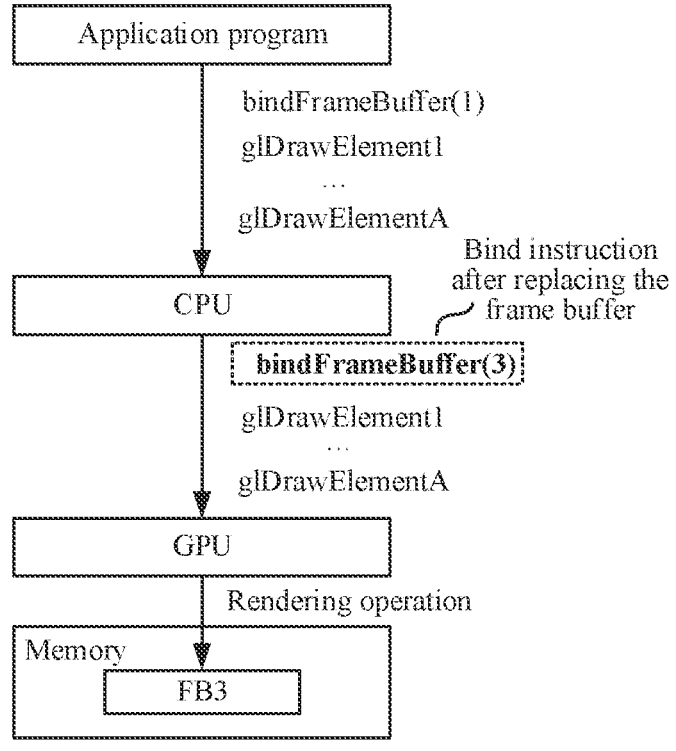
FIG. 8 is a schematic diagram of issuing a rendering command according to an embodiment of this application.

For example, referring to FIG. 8, the primary scene is a FB1, the corresponding temporary frame buffer is a FB3, and in a process of rendering the $N^{th}$ frame of image, a quantity of drawcalls included in the FB1 is 2 (such as glDrawElement1 and glDrawElement2), and the rendering command received by the CPU from the application program includes the following instructions:

bindFrameBuffer(1);
    glDrawElement1; and
    glDrawElement2.

In this example, the CPU can replace an identifier (such as the FB1) used for binding the primary scene in the rendering command of the $N^{th}$ frame of image with an identifier of the temporary frame buffer (such as the FB3). In some embodiments, the frame buffer object of the FB1 may also be referred to as first frame buffer information, and the frame buffer object of the FB3 may also be referred to as second frame buffer information. For example, the CPU can replace the bindFrameBuffer(1) with a bindFrameBuffer (3). Then, the replaced rendering command may be:

bindFrameBuffer(3);
    glDrawElement1; and
    glDrawElement2.

That is to say, the CPU can replace a rendering operation originally bound to the primary scene (such as the FB1) with a rendering operation bound to the temporary frame buffer. Then, the CPU can issue the rendering instruction (for example, referred to as a first rendering instruction) to the GPU. In this way, the GPU can execute rendering operations of glDrawElement1 and glDrawElement2 on the FB3, and store results on the FB3. In some embodiments, in the process of rendering the $N^{th}$ frame of image, the rendering operation executed on the primary scene (or the temporary frame buffer) may also be referred to as a first rendering operation.

It may be understood that since the resolution of the FB3 is less than the resolution of the FB1, executing same drawcalls (such as glDrawElement1 and glDrawElement2) on the FB3 requires less power consumption and generates less heat.

It should be noted that, in some embodiments, the electronic device can execute the foregoing solution for rendering operations of all primary scenes by using the CPU, for example, a temporary frame buffer with a smaller resolution is used for executing the rendering operation of the primary scene. In some other embodiments, the electronic device may also refer to a solution shown in FIG. 7A when power consumption control is required. For example, as a possible implementation, the electronic device may determine that the power consumption control needs to be performed when the load is greater than a preset threshold. Therefore, the solution shown in FIG. 7A may be triggered to reduce power consumption in the process of image processing. As another possible implementation, the electronic device may perform the foregoing solution with reference to the resolution of the primary scene. For example, in a case that it is determined that the resolution of the primary scene is greater than a preset resolution, and/or a quantity of drawcalls executed in the primary scene is greater than a preset rendering threshold, the electronic device may execute S702, that is, configure a temporary frame buffer for the primary scene, and then execute a rendering operation of the primary scene in the temporary frame buffer with a smaller resolution.

Figure 9:
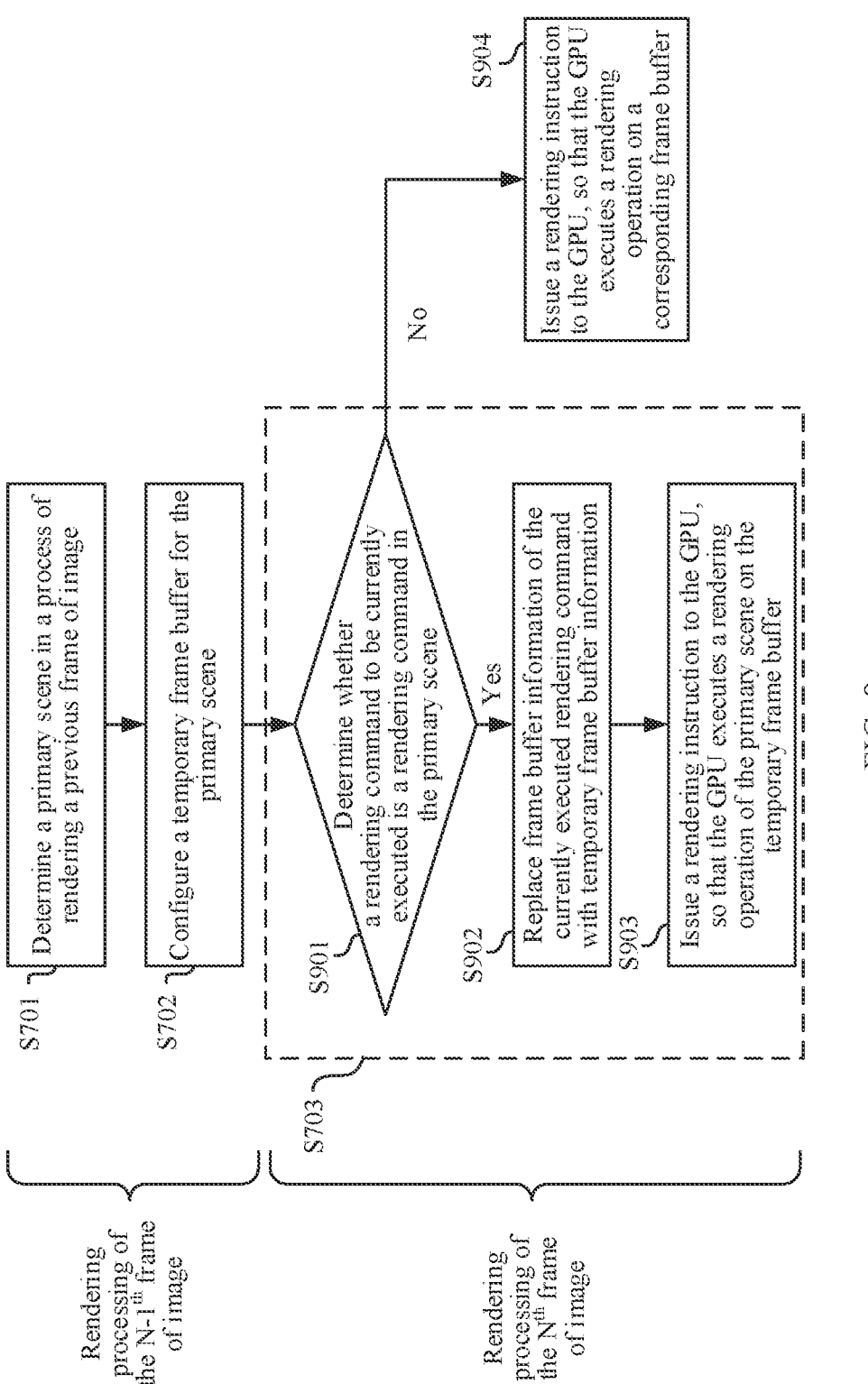
FIG. 9 is a schematic flowchart of an image processing method according to an embodiment of this application.

As an implementation, with reference to the solution shown in FIG. 7A, FIG. 9 shows a schematic flowchart of still another image processing method according to an embodiment of this application. In some embodiments, the solution may be executed by the CPU in the electronic device, so that the resolution corresponding to the primary scene of the rendering operation is dynamically adjusted, thereby reducing power consumption overheads.

As shown in FIG. 9, based on the solution shown in FIG. 7A, S703 may be specifically implemented through S901-S903.

S901: Determine whether a rendering command to be currently executed is a rendering command in the primary scene.

For example, the CPU can determine whether the rendering command needs to be currently executed in the primary scene according to whether a frame buffer object that needs to be bound indicated by a bindFrameBuffer( ) in the received rendering command is the same as a frame buffer object of the primary scene determined in S701.

For example, in a case that the currently executed rendering command is a bindFrameBuffer(1), and the primary scene determined in S701 is the FB1, the electronic device can determine that the currently executed rendering command needs to be executed in the primary scene.

For another example, in a case that the currently executed rendering command is a bindFrameBuffer(2), and the primary scene determined in S701 is the FB1, the electronic device can determine that the currently executed rendering command does not need to be executed in the primary scene.

In a case that it is determined that the currently executed rendering command is executed in the primary scene, the CPU of the electronic device may continue to execute the following S902.

S902: Replace frame buffer information of the currently executed rendering command with temporary frame buffer information.

The frame buffer information may include a frame buffer object that needs to be bound to the currently executed command.

For example, with reference to the foregoing description of S703, the CPU may replace the FB1 corresponding to the bindFrameBuffer(1) with a frame buffer object (such as the FB3) of the temporary frame buffer. For example, the replaced command may be: bindFrameBuffer(3).

S903: Issue a rendering instruction to the GPU, so that the GPU executes a rendering operation of the primary scene on the temporary frame buffer.

In this example, the GPU may execute a corresponding rendering operation based on the received rendering instruction. For example, when the bindFrameBuffer(3) and subsequent drawcalls are received, the GPU can execute rendering operations of the drawcalls on the FB3 and store rendering results on the FB3.

It may be understood that since the resolution of the FB3 is less than the resolution of the FB1, the GPU can complete the same quantity of drawcalls by using less computing resources. The drawcalls in the FB1 may be a largest quantity of drawcalls in the process of rendering the $N^{th}$ frame of image. Therefore, in the solution (as shown in FIG.

7A or FIG. 9), consumption of computing power in the process of rendering the $N^{th}$ frame of image may be significantly reduced.

In some embodiments, as shown in FIG. 9, the CPU may further execute S904 based on a determining result after a determining of S901 is performed.

For example, in a case that the CPU determines that the rendering command to be currently executed is not a rendering command in the primary scene, S904 may be executed. With reference to the description in S901, in a case that a frame buffer object of a frame buffer that needs to be bound to the rendering command to be currently executed is different from the frame buffer object of the primary scene, the CPU may determine that the rendering command to be currently executed is not a rendering command in the primary scene.

It may be understood that since the rendering command to be currently executed is not executed in the primary scene, computing power consumed by the rendering command is not the most consumed in the process of rendering the $N^{th}$ frame of image. Then, the CPU can directly control the GPU to execute a corresponding drawcall on a frame buffer specified by the rendering command. For example, execute S904: Issue a rendering instruction to the GPU, so that the GPU executes a rendering operation on a corresponding frame buffer.

As shown in FIG. 9, for example, the CPU currently renders the $N^{th}$ frame of image. In some embodiments, the CPU may complete processing of S701-S702 after the rendering processing of the $(N-1)^{th}$ frame of image is completed. That is, a primary scene of the $N^{th}$ frame of image is determined, and a corresponding temporary frame buffer is configured for the primary scene. For example, the application program issuing the rendering command is a game application. The CPU may execute S701-S702 at the beginning of the game. For example, the CPU may be configured to execute the solution shown in FIG. 7A or FIG. 9 starting from the sixth frame of image. Then, after the game starts and rendering of the fifth frame of image is completed, the CPU can determine a primary scene and configure a corresponding temporary frame buffer for the primary scene according to a rendering situation of the fifth frame of image. Therefore, in the process of rendering the sixth frame of image, the CPU may use the temporary frame buffer to execute a drawcall of the primary scene, so that power consumption overheads in the rendering process is significantly reduced.

It should be noted that, in the foregoing example, the method of replacing the primary scene and the temporary frame buffer is described by using an example that the rendering command issued by the application program points to the primary scene through the bindFrameBuffer( ) function. In some other implementations of this application, when the rendering command issued by the application program further includes other functions pointing to the primary scene, the CPU may further replace a frame buffer object pointed to by a corresponding function through a similar solution. For example, the primary scene is replaced with a temporary frame buffer, so that a corresponding rendering operation may be executed on the temporary frame buffer.

For example, the CPU can replace an identifier of an attachment included in a texture of the current frame buffer, so that the GPU can use a correct attachment to execute corresponding rendering processing in the temporary frame buffer. For example, the primary scene is the FB1, and the temporary frame buffer is the FB3. The identifier of the attachment (such as a color attachment, a depth attachment) of the FB1 may be 11. Then, after the identifier of the FB1 is replaced with the FB3, the CPU may further replace the identifier of the attachment of the FB1 accordingly. For example, the attachment 11 is replaced with the attachment 13 (that is, an identifier of an attachment of the FB3). For example, glBindTexture(GL_TEXTURE_2D, 11) is replaced with glBindTexture(GL_TEXTURE_2D, 13). In this way, when rendering processing is executed on the FB3, correct rendering processing may be executed based on information on the attachment 13.

Through the description of the foregoing solution, the rendering resolution of the primary scene may be reduced.

In some other implementations of the embodiments of this application, when the rendering operation of the primary scene is executed on the temporary frame buffer, the electronic device may use a multisampling technology to improve display effect of a rendering result obtained by rendering at a reduced resolution, and further improve quality of the image displayed to the user.

For example, when a rendering instruction is issued to the GPU to execute a rendering operation in the temporary frame buffer, the CPU can instruct the GPU to use more color, depth and/or template information to process primitives (such as points, lines, polygons, and the like), to achieve an effect of blurring the edge of the image. In this way, when a result obtained after the rendering operation is executed in the temporary frame buffer is displayed, an edge of the image may not appear jagged due to the low resolution. In this way, image quality can be improved.

The solutions provided in the embodiments of this application are mainly described above from a perspective of an electronic device. To implement the foregoing functions, the electronic device includes corresponding hardware structures and/or software modules for performing the functions. A person skilled in the art should be easily aware that units, algorithms, and steps in the examples described with reference to the embodiments disclosed in this specification can be implemented in a form of hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, functional module division may be performed on the involved device according to the examples of the methods. For example, various functional modules may be divided according to the corresponding functions, or two or more functions may be integrated into one processing module. The integrated module is implemented in the form of hardware, or is implemented in the form of a software functional module. It should be noted that, in the embodiments of this application, the module division is an example, and is merely logical function division, and there may be other division manners during actual implementation.

Figure 10:
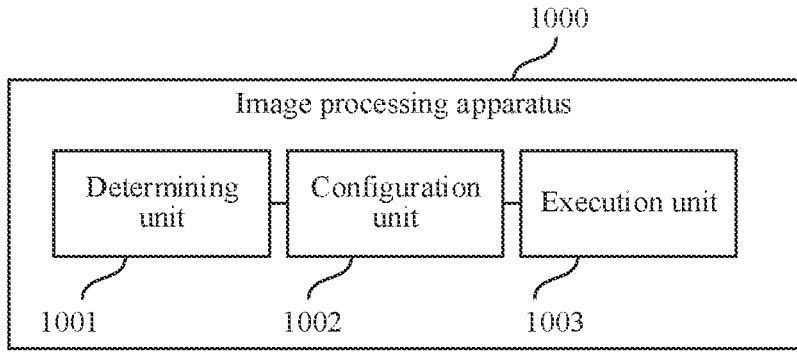
FIG. 10 is a schematic composition diagram of an image processing apparatus according to an embodiment of this application.

FIG. 10 is a schematic composition diagram of an image processing apparatus 1000 according to an embodiment of this application. The apparatus may be arranged in an electronic device to implement any one of possible image processing methods provided in the embodiments of this application.

For example, the apparatus may be applicable to rendering processing of a first image by an electronic device. The electronic device runs an application program, the electronic device calls one or more frame buffers when rendering the first image, and a rendering operation of the electronic device to execute the rendering processing on the first image is issued by the application program.

As shown in FIG. 10, the apparatus includes: a determining unit 1001, configured to determine a first primary scene in a process of executing rendering processing on a first image, where the first primary scene is a frame buffer that executes a largest quantity of rendering operations in the process of rendering the first image by the electronic device; a configuration unit 1002, configured to configure a temporary frame buffer, where resolution of the temporary frame buffer is less than resolution of the first primary scene; and an execution unit 1003, configured to execute a first rendering operation on the temporary frame buffer when rendering processing is performed on the first image, where the first rendering operation is a rendering operation executed on the first primary scene indicated by an application program.

In a possible design, the determining unit 1001 is further configured to determine the first primary scene based on the frame buffer that executes a largest quantity of rendering operations in a process of rendering a second image. Rendering processing of the second image is executed before the rendering processing of the first image; and the first primary scene is called when the rendering processing is executed on the second image.

In a possible design, the determining unit 1001 is further configured to determine a quantity of drawcalls (drawcalls) executed on each frame buffer in the process of rendering the second image, and determine a frame buffer that executes a largest quantity of drawcalls as the first primary scene.

In a possible design, the second image is a previous frame of image of the first image.

It should be noted that, all related content of the steps in the foregoing method embodiment may be quoted to functional descriptions of corresponding functional modules, and details are not described herein again.

In a possible implementation, functions of the units shown in FIG. 10 may be implemented by hardware modules as shown in FIG. 4. For example, take the execution unit 1003 shown in FIG. 10 as an example. The function of the execution unit 1003 can be implemented by the processor and the rendering processing module as shown in FIG. 4. The rendering processing module may be a module having a graphics rendering function. In some embodiments, the rendering processing module may be the CPU as shown in FIG. 4. In some embodiments, the processor may be the CPU as shown in FIG. 4.

As an example, the implementation of the function of the execution unit 1003 by the processor in cooperation with the rendering processing module is described.

For example, in a case that a rendering command for the first image is received from the application program, the processor is configured to issue a first rendering instruction to the rendering processing module, where the first rendering instruction includes the first rendering operation, and the first rendering instruction is used for instructing the rendering processing module to execute the first rendering operation on the temporary frame buffer. The rendering processing module is configured to execute the first rendering operation on the temporary frame buffer based on the first rendering instruction.

In a possible design, the processor is further configured to replace frame buffer information bound to the currently executed rendering command from first frame buffer information to second frame buffer information in a case that the currently executed rendering command is determined as a rendering command for the primary scene before the processor issues the first rendering instruction to the rendering processing module, to obtain the first rendering instruction. The first frame buffer information is used for indicating that the first rendering operation is executed on the primary scene, and the second frame buffer information is used for indicating that the first rendering operation is executed on the temporary frame buffer.

In a possible design, the first frame buffer information includes a first frame buffer object, where the first frame buffer object is a frame buffer object corresponding to the primary scene, and the second frame buffer information includes a second frame buffer object, where the second frame buffer object is a frame buffer object corresponding to the temporary frame buffer.

In a possible design, the rendering command is issued by the application program to the processor, and the rendering command includes the first rendering operation and the first frame buffer information.

In a possible design, the first rendering instruction further includes: performing multisampling on an image obtained by the first rendering operation.

Figure 11:
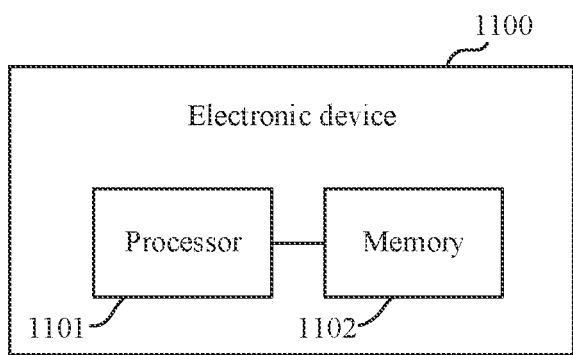
FIG. 11 is a schematic composition diagram of an electronic device according to an embodiment of this application.

FIG. 11 is a schematic composition diagram of an electronic device 1100. As shown in FIG. 11, the electronic device 1100 may include, a processor 1101 and a memory 1102. The memory 1102 is configured to store computer executable instructions. For example, in some embodiments, when the processor 1101 executes the instructions stored in the memory 1102, the electronic device 1100 is enabled to perform the image processing method according to any one of the foregoing embodiments.

It should be noted that, all related content of the steps in the foregoing method embodiment may be quoted to functional descriptions of corresponding functional modules, and details are not described herein again.

Figure 12:
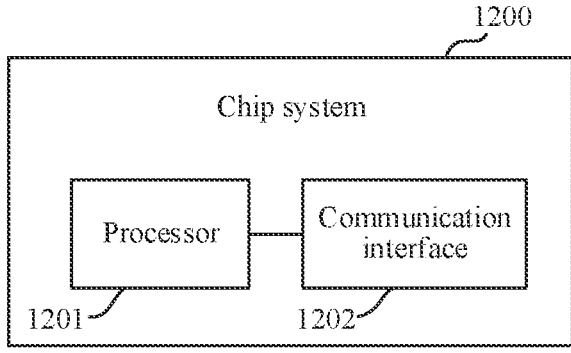
FIG. 12 is a schematic composition diagram of a chip system according to an embodiment of this application.

FIG. 12 is a schematic composition diagram of a chip system 1200. The chip system 1200 may include: a processor 1201 and a communication interface 1202, configured to support related devices to implement the functions involved in the foregoing embodiments. In a possible design, the chip system further includes a memory for saving necessary program instructions and data of a terminal. The chip system may include a chip, or may include a chip and another discrete device. It should be noted that, in some implementations of this application, the communication interface 1202 may also be referred to as an interface circuit.

It should be noted that, all related content of the steps in the foregoing method embodiment may be quoted to functional descriptions of corresponding functional modules, and details are not described herein again.

All or some of the functions or motions or operations or steps in the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, all or some of the processes or functions according to the embodiments of this application are produced. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

Although this application is described with reference to specific features and embodiments thereof, it is clear that various modifications and combinations may be made to them without departing from the spirit and scope of this application. Correspondingly, this specification and the accompanying drawings are merely example description of this application defined by the appended claims, and are considered as any or all of modifications, variations, combinations or equivalents that cover the scope of this application. It is clearly that a person skilled in the art can make various modifications and variations to this application without departing from the spirit and scope of this application. This application is intended to cover such modifications and variations provided that the modifications and variations of this application fall within the scope of the claims of this application and their equivalent technologies.

What is claimed is:

1. An image processing method, applicable to an electronic device, wherein the electronic device is configured to run an application program and execute a rendering operation issued by the application program, the method comprising:

executing a first rendering operation of a first image on a first frame buffer and a second frame buffer; and executing a rendering operation of a second image on a third frame buffer and the second frame buffer, wherein the third frame buffer is different than the second frame buffer and different than the first frame buffer, wherein the first image and the second image are two consecutive frames of images, wherein the first rendering operation of the first image is not executed on the third frame buffer, wherein the rendering operation of the second image is not executed on the first frame buffer, wherein a resolution of the third frame buffer is less than a resolution of the first frame buffer, the resolutions being defined according to pixel height and pixel width, and wherein, responsive to a correlation existing between content of the first image and content of the second image, rendering of the second image is assigned to the third frame buffer rather than the first frame buffer based on a quantity of rendering operations executed on the first frame buffer being greater than a quantity of rendering operations executed on the second frame buffer and the resolution of the third frame buffer being less than the resolution of the first frame buffer.

2. The image processing method of claim 1, wherein a quantity of frame buffers used for drawing the first image is the same as a quantity of frame buffers used for drawing the second image.

3. The image processing method of claim 2, wherein a quantity of rendering operations of the first image executed on the first frame buffer is the same as a quantity of rendering operations of the second image executed on the third frame buffer.

4. The image processing method of claim 3, wherein the first rendering operation of the first image executed on the first frame buffer is the same as the rendering operation of the second image executed on the third frame buffer.

5. The image processing method of claim 4, further comprising creating the third frame buffer.

6. The image processing method of claim 4, wherein the first frame buffer is a frame buffer that executes a greatest quantity of rendering operations in the process of rendering the first image by the electronic device.

7. The image processing method of claim 6, further comprising determining a frame buffer that executes a greatest quantity of rendering operations in the process of rendering the first image by the electronic device.

8. The image processing method of claim 7, further comprising:

determining a quantity of drawcalls executed on each frame buffer in the process of rendering the first image; and determining a frame buffer that executes a greatest quantity of drawcalls as the first frame buffer.

9. The image processing method of claim 1, wherein the rendering operation is glDrawElement.

10. The image processing method of claim 1, wherein the rendering operation of the second image is after the first and second rendering operations of the first image, the first frame buffer is used for rendering of a primary scene of the first image, and the third frame buffer is used for rendering of a primary scene of the second image.

11. The image processing method of claim 10, wherein the electronic device is provided with one or more processors and a rendering processing module, and wherein executing the rendering operation of the first image on the first frame buffer and the second frame buffer comprises:

issuing, by the one or more processors, a first rendering instruction stream to the rendering processing module in a case that the one or more processors receive the rendering operation on the first image from the application program, wherein the first rendering instruction stream instructs the rendering processing module to execute the rendering operation of the first image on the first frame buffer and the second frame buffer; and executing, by the rendering processing module, the rendering operation of the first image on the first frame buffer and the second frame buffer based on the first rendering instruction stream.

12. The image processing method of claim 11, wherein executing the rendering operation of the second image on the third frame buffer and the second frame buffer comprises:

issuing, by the one or more processors, a second rendering instruction stream to the rendering processing module in a case that the one or more processors receives the rendering operation on the first image from the application program, wherein the rendering operation of the application program on the second image instructs the rendering processing module to execute the rendering operation of the second image on the first frame buffer and the second frame buffer, and the second rendering instruction stream instructs the rendering processing module to execute the rendering operation of the second image on the third frame buffer and the second frame buffer; and executing, by the rendering processing module, the rendering operation of the second image on the third frame buffer and the second frame buffer based on the second rendering instruction stream.

13. The image processing method of claim 12, wherein before issuing the second rendering instruction stream to the rendering processing module, the method further comprises:

determining, by the one or more processors, the frame buffer executing the greatest quantity of rendering operations as the first frame buffer based on the rendering operation of the first image; and creating, by the one or more processors, the third frame buffer, wherein the third frame buffer is used for executing the rendering operation on the first frame buffer.

14. The image processing method of claim 13, wherein after creating the third frame buffer, the method further comprises replacing, by the one or more processors, a frame buffer pointed to by the rendering operation executed on the first frame buffer with the third frame buffer in the rendering operation of the application program on the second image, to obtain a third rendering instruction stream.

15. The image processing method of claim 14, wherein the one or more processors a central processing unit (CPU).

16. The image processing method of claim 15, wherein the rendering processing module is a graphics processing unit (GPU).

17. The image processing method of claim 16, further comprising performing multisampling on the second image.

18. An electronic device, comprising:

one or more processors; and one or more memories coupled to the one or more processors, wherein the one or more memories store computer instructions that, when executed by the one or more processors, cause the electronic device to be configured to:

execute a first rendering operation of a first image on a first frame buffer and a second frame buffer; and execute a rendering operation of a second image on a third frame buffer and the second frame buffer, wherein the third frame buffer is different than the second frame buffer and different than the first frame buffer, wherein the first image and the second image are two consecutive frames of images, wherein the rendering operation of the first image is not executed on the third frame buffer, wherein the rendering operation of the second image is not executed on the first frame buffer, wherein a quantity of rendering operations of the first image executed on the first frame buffer is greater than or the same as a quantity of rendering operations of the second image executed on the third frame buffer, wherein a resolution of the third frame buffer is less than a resolution of the first frame buffer, the resolutions being defined according to pixel height and pixel width, and wherein, responsive to a correlation existing between content of the first image and content of the second image, rendering of the second image is assigned to the third frame buffer rather than the first frame buffer based on a quantity of rendering operations executed on the first frame buffer being greater than a quantity of rendering operations executed on the second frame buffer and the resolution of the third frame buffer being less than the resolution of the first frame buffer.

19. A non-transitory computer-readable storage medium containing instructions that, when executed by one or more processors of an electronic device, cause the electronic device to be configured to:

execute a first rendering operation of a first image on a first frame buffer and a second frame buffer; and execute a rendering operation of a second image on a third frame buffer and the second frame buffer, wherein the third frame buffer is different than the second frame buffer and different than the first frame buffer, wherein the first image and the second image are two consecutive frames of images, wherein the rendering operation of the first image is not executed on the third frame buffer, wherein the rendering operation of the second image is not executed on the first frame buffer, wherein a resolution of the third frame buffer is less than a resolution of the first frame buffer, the resolutions being defined according to pixel height and pixel width, and wherein, responsive to a correlation existing between content of the first image and content of the second image, rendering of the second image is assigned to the third frame buffer rather than the first frame buffer based on a quantity of rendering operations executed on the first frame buffer being greater than a quantity of rendering operations executed on the second frame buffer and the resolution of the third frame buffer being less than the resolution of the first frame buffer.

20. The electronic device of claim 18, wherein the quantity of frame buffers used for drawing the first image is the same as the quantity of frame buffers used for drawing the second image.

* * * * *